(12) United States Patent
Mayer et al.

(10) Patent No.: US 12,077,695 B2
(45) Date of Patent: Sep. 3, 2024

(54) DETACHABLE ADHESIVE STRIP

(71) Applicant: TESA SE, Norderstedt (DE)

(72) Inventors: Michael Mayer, Hamburg (DE); Jan Ole Pöhls, Hamburg (DE); Thomas Schubert, Norderstedt (DE)

(73) Assignee: tesa SE, Norderstedt (DE)

( * ) Notice: Subject to any disclaimer, the term of this patent is extended or adjusted under 35 U.S.C. 154(b) by 323 days.

(21) Appl. No.: 17/598,676

(22) PCT Filed: Mar. 23, 2020

(86) PCT No.: PCT/EP2020/057941
§ 371 (c)(1),
(2) Date: Sep. 27, 2021

(87) PCT Pub. No.: WO2020/193461
PCT Pub. Date: Oct. 1, 2020

(65) Prior Publication Data
US 2022/0195260 A1 Jun. 23, 2022

(30) Foreign Application Priority Data
Mar. 28, 2019 (DE) ...................... 10 2019 204 344.5

(51) Int. Cl.
| C09J 7/38 | (2018.01) |
| C09J 11/04 | (2006.01) |
| C09J 153/02 | (2006.01) |

(52) U.S. Cl.
CPC .............. C09J 7/387 (2018.01); C09J 11/04 (2013.01); C09J 153/02 (2013.01); C09J 2203/326 (2013.01); C09J 2203/37 (2020.08); C09J 2301/302 (2020.08); C09J 2453/00 (2013.01)

(58) Field of Classification Search
CPC ........... C09J 7/387; C09J 153/02; C09J 11/04
USPC ....................................................... 428/216
See application file for complete search history.

(56) References Cited

U.S. PATENT DOCUMENTS

| 4,024,312 | A | 5/1977 | Korpman |
| 4,735,837 | A | 4/1988 | Miyasaka et al. |
| 4,885,170 | A | 12/1989 | Hamill et al. |
| 5,409,189 | A | 4/1995 | Luehmann |
| 5,491,012 | A | 2/1996 | Luehmann et al. |
| 5,507,464 | A | 4/1996 | Hamerski et al. |
| 5,626,931 | A | 5/1997 | Luehmann |
| 5,626,932 | A | 5/1997 | Luehmann et al. |
| 5,672,402 | A | 9/1997 | Kreckel et al. |
| 5,897,949 | A | 4/1999 | Luehmann et al. |
| 5,967,474 | A | 10/1999 | doCanto et al. |
| 6,004,665 | A | 12/1999 | Luehmann et al. |
| 6,245,177 | B1 | 6/2001 | Luehmann |
| 6,280,840 | B1 | 8/2001 | Luehmann et al. |
| 6,342,720 | B1 | 1/2002 | Presting et al. |
| 6,372,335 | B1 | 4/2002 | Luehmann et al. |
| 6,395,389 | B1 | 5/2002 | Luehmann et al. |
| 6,402,875 | B1 | 6/2002 | Luehmann et al. |
| 6,544,639 | B1 | 4/2003 | Luehmann et al. |
| 6,641,892 | B2 | 11/2003 | Luehmann |
| 6,680,096 | B1 | 1/2004 | Luehmann et al. |
| 6,841,241 | B2 | 1/2005 | Luehmann et al. |
| 6,874,740 | B1 | 4/2005 | Leiber et al. |
| 6,887,919 | B2 | 5/2005 | Krawinkel et al. |
| 7,101,615 | B2 | 9/2006 | Luehmann et al. |
| 7,264,870 | B2 | 9/2007 | Luehmann et al. |
| 7,531,595 | B2 | 5/2009 | Lewandowski et al. |
| 9,944,832 | B2 | 4/2018 | Melnikova et al. |
| 10,759,974 | B2 | 9/2020 | Blazejewski et al. |
| 11,084,958 | B2 | 8/2021 | Krawinkel et al. |
| 2002/0017359 | A1 | 2/2002 | Luhmann |
| 2002/0034628 | A1 | 3/2002 | Luhmann et al. |
| 2002/0051875 | A1 | 5/2002 | Luhmann et al. |
| 2002/0168516 | A1 | 11/2002 | Luhmann et al. |
| 2003/0215660 | A1 | 11/2003 | Krawinkel et al. |
| 2011/0054074 | A1 | 3/2011 | Jonschker et al. |
| 2011/0250375 | A1 | 10/2011 | Bries et al. |
| 2011/0268929 | A1 | 11/2011 | Tran et al. |
| 2015/0337177 | A1 | 11/2015 | Krawinkel et al. |

(Continued)

FOREIGN PATENT DOCUMENTS

| CN | 107466314 A | 12/2017 |
| DE | 33 31 016 | 10/1984 |

(Continued)

OTHER PUBLICATIONS

Machine_English_translation_WO_2014174958_A; Actinic-Radiation-Curable Self-Rolling Pressure-Sensitive Adhesive Tape; Oct. 30, 2014; EPO; whole document (Year: 2023).*

Primary Examiner — Tahseen Khan
(74) Attorney, Agent, or Firm — Norris McLaughlin, P.A.

(57) ABSTRACT

The invention relates to an adhesive strip which can be detached substantially on the adhesion plane in a residue-free and nondestructive manner by stretching, said strip consisting of one or more adhesive material layers and optionally one or more intermediate carrier layers, at least one of the adhesive materials layers containing at least one filler, the primary particles of which can be individually separated, wherein the primary particles (i) are substantially spherical and (ii) have an average diameter d(0.5) of less than 10 μm, and the ratio of the average diameter d(0.5) of the primary particles to the thickness of the adhesive material layer in which the primary particles are contained is less than 1:2. The invention also relates to the production and use of said adhesive strip.

23 Claims, No Drawings

(56) References Cited

U.S. PATENT DOCUMENTS

| | | |
|---|---|---|
| 2016/0333233 A1 | 11/2016 | Melnikova et al. |
| 2017/0218233 A1 | 8/2017 | Lee et al. |
| 2018/0079937 A1 | 3/2018 | Blazejewski et al. |
| 2018/0112110 A1* | 4/2018 | Blazejewski ............ C09J 11/08 |

FOREIGN PATENT DOCUMENTS

| | | |
|---|---|---|
| DE | 35 37 433 A1 | 10/1986 |
| DE | 42 22 849 C1 | 6/1993 |
| DE | 42 33 872 A1 | 3/1994 |
| DE | 44 28 587 A1 | 2/1996 |
| DE | 44 31 914 A1 | 3/1996 |
| DE | 195 11 288 C1 | 10/1996 |
| DE | 195 31 696 A1 | 3/1997 |
| DE | 196 49 636 A1 | 6/1998 |
| DE | 196 49 727 A1 | 6/1998 |
| DE | 196 49 728 A1 | 6/1998 |
| DE | 196 49 729 A1 | 6/1998 |
| DE | 197 08 364 A1 | 9/1998 |
| DE | 197 20 145 A1 | 11/1998 |
| DE | 197 23 177 A1 | 12/1998 |
| DE | 197 23 198 A1 | 12/1998 |
| DE | 197 56 816 C1 | 2/1999 |
| DE | 197 56 084 A1 | 7/1999 |
| DE | 198 20 858 A1 | 11/1999 |
| DE | 198 42 864 A1 | 3/2000 |
| DE | 198 42 865 A1 | 3/2000 |
| DE | 199 38 693 A1 | 2/2001 |
| DE | 100 03 318 A1 | 8/2001 |
| DE | 100 63 018 B4 | 7/2002 |
| DE | 102 12 049 A1 | 10/2003 |
| DE | 10 2012 223 670 A1 | 6/2014 |
| DE | 10 2015 206 076 A1 | 10/2016 |
| DE | 10 2015 208 792 A1 | 11/2016 |
| DE | 10 2017 218 264 A1 | 4/2019 |
| EP | 0 257 984 A2 | 3/1988 |
| EP | 0 693 097 B1 | 1/1999 |
| EP | 1 102 809 B1 | 6/2005 |
| EP | 1 995 282 A1 | 11/2008 |
| EP | 2 268 757 A1 | 1/2012 |
| JP | 2012-514075 A | 6/2012 |
| KR | 10-2017-0134609 A | 12/2017 |
| WO | 92/11332 A1 | 7/1992 |
| WO | 92/11333 A1 | 7/1992 |
| WO | 94/21157 A1 | 9/1994 |
| WO | 95/06691 A1 | 3/1995 |
| WO | 95/31225 A1 | 11/1995 |
| WO | 97/07172 A1 | 2/1997 |
| WO | 98/03601 A1 | 1/1998 |
| WO | 98/18878 A1 | 5/1998 |
| WO | 99/31193 A1 | 6/1999 |
| WO | 99/37729 A1 | 7/1999 |
| WO | 99/63018 A1 | 12/1999 |
| WO | 00/12644 A1 | 3/2000 |
| WO | 2007 058812 A1 | 5/2007 |
| WO | 2009 114683 A1 | 9/2009 |
| WO | 2010 077541 A1 | 7/2010 |
| WO | 2010 078396 A2 | 7/2010 |
| WO | 2010/082658 A1 | 7/2010 |
| WO | 2010 141248 A1 | 12/2010 |
| WO | 2010 147888 A2 | 12/2010 |
| WO | 2011 133518 A1 | 10/2011 |
| WO | WO-2014174958 A1 * | 10/2014 ............... C08K 7/16 |
| WO | 2016 047436 A1 | 3/2016 |
| WO | 2019/072707 A1 | 4/2019 |

* cited by examiner

DETACHABLE ADHESIVE STRIP

This application is a 371 of PCT/EP2020/057941, filed Mar. 23, 2020, which, in turn, claims priority of German Application No. 10 2019 204 344.5, filed Mar. 28, 2019, the entire contents of which patent applications are hereby incorporated herein by reference.

The invention relates to a filler-containing pressure-sensitive adhesive strip which can be used to produce a bond that can be parted again by extensive stretching.

The use of fillers in polymer compositions and adhesives, with the aim, for example, of modifying the price, appearance or certain properties, is common knowledge. Chalk, for example, is a popular filler for natural rubber-based formulations; hollow glass beads or hollow polymeric beads are frequently used for producing acrylate foams. A wide spectrum of filler dimensions and filler morphologies are known, ranging from nanosized to macroscale and from hollow via porous, round, lamellar and laminar through to dendritic fillers.

Known, for example, is the use of macroscale hollow beads, as is described in WO 2007 058812 A1 or EP 1 995 282 A1.

Nanosized fillers are frequently precipitated or fumed silicas or else carbon blacks. These substances prove difficult to disperse, with their reinforcing effect frequently being dependent on the outcome of dispersing in the production process. Fumed silica is employed in particular for modifying the coating viscosity. Its effect is usually associated with its three-dimensional structure, producing thickening and thixotropic effects. The primary characteristic of fumed silicas is that the primary particles are usually 5-50 nm in size and inseparable, instead being bound indivisibly in the form of aggregates. These aggregates then form agglomerates, which may have diameters of up to the micrometer scale.

Also known is the use of silica in polyacrylates foamed with microballoons—from WO 2010 147888 A2, for example.

U.S. Pat. No. 7,531,595 teaches the use of acicular silica nanofillers having an average diameter of 9 to 25 nm and a length of 40 to 300 nm.

EP 2 268 757 A1 discloses nanosized core-shell particles which are used in order to influence the properties of polymers. Disadvantageous in this case are costly and inconvenient production processes. It would be desirable not to have to use a core-shell architecture, since such particles can be produced only at high cost and in complicated processes.

The use of certain inorganic fillers in pressure-sensitive adhesives (PSAs) is disclosed in DE 10 2015 208 792 A1. WO 2011 133 518 A1 describes the use of surface-modified silicon dioxides having a particle size of less than 100 nm in PSAs.

Many applications require a high PSA strength. The term "strength" refers in this case to the fracture resistance of the adhesive, and not to the adhesion occurring at the interface with the substrate to be bonded. Frequently PSAs are to have not only high strength but also high stretchability, since high stretchability in conjunction with high strength results in high toughness. The toughness may be understood as the energy-absorbing capacity of the material.

One way to increase the strength of adhesives is to use fillers. These fillers, however, generally impair the stretchability and often the adhesion as well. Satisfactory strength and stretchability in adhesives is therefore generally impossible to achieve. One filled PSA is disclosed in the as yet unpublished DE 10 2017 218 264. The PSA comprises at least one polymer and at least one filler which can be separated into its primary particles, with this filler comprising spherical primary particles having a median diameter d(0.5) of 50 nm to 10 μm and with these particles not being composed of concentric layers.

Elastically or plastically highly stretchable pressure-sensitive adhesive tapes (PSA tapes) which can be detached again without residue or destruction by extensive stretching in the bond plane, i.e., at a peel angle of 0°, are known from U.S. Pat. No. 4,024,312 A, DE 33 31 016 C2, WO 92/11332 A1, WO 92/11333 A1, DE 42 22 849 C1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 858 A1, WO 99/37729 A1, and DE 100 03 318 A1, for example, and are also referred to below as strippable PSA tapes.

Strippable PSA tapes of these kinds are frequently used in the form of single- or double-sidedly adhesive film strips, which preferably have a nonadhesive tab region from which the detachment process is initiated. Particular applications of corresponding PSA tapes are found, inter alia, in DE 42 33 872 C1, DE 195 11 288 C1, U.S. Pat. Nos. 5,507,464 B1, 5,672,402 B1, and WO 94/21157 A1. Specific embodiments are also described in DE 44 28 587 C1, DE 44 31 914 C1, WO 97/07172 A1, DE 196 27 400 A1, WO 98/03601 A1, and DE 196 49 636 A1, DE 197 20 526 A1, DE 197 23 177 A1, DE 197 23 198 A1, DE 197 26 375 A1, DE 197 56 084 C1, DE 197 56 816 A1, DE 198 42 864 A1, DE 198 42 865 A1, WO 99/31193 A1, WO 99/37729 A1, WO 99/63018 A1, WO 00/12644 A1, and DE 199 38 693 A1.

The use of fillers in PSAs for strippable products is likewise known per se—for example, from DE 102 12 049 A1 or DE 100 63 018 B4.

Preferred fields of use of aforesaid strippable adhesive film strips include, in particular, the residuelessly and non-destructively redetachable securement of lightweight to medium-weight articles in the residential, work, and office segments. For use in the home and office segments, the products used are generally of considerable thickness, of more than 400 μm. In the consumer electronics industry—such as, for example, in the production of mobile telephones, digital cameras or laptops—there is an ever-growing desire for an option to separate the individual components on disposal after they have been used. In that case certain components can be used again or processed. Or at least there is a possibility of separate disposal. Releasable adhesive bonds are therefore of great interest in this industry. In particular, adhesive tapes which possess a high holding power and can be easily removed as and when desired constitute a reasonable alternative here to adhesive strips which, for detachment, must firstly be pretreated—by heating them, for example. Within the consumer electronics segment, the preference is for adhesive strips which are extremely thin, since the end devices are to be extremely thin and hence all of the individual components are to take up little space as well.

When very thin strippable adhesive strips are used which operate without carriers, there is increased incidence of tears (see DE 33 31 016 C2). If the adhesive strips tear, then detachment is generally no longer possible, however, since the remnant of the adhesive strip springs back into the bond line and there is therefore no finger tab available.

WO 92/11333 A1 describes a strippable adhesive tape which uses as carrier a highly stretchable film with a resilience after stretching of <50%.

WO 92/11332 A1 describes an adhesive film strip which is redetachable by pulling in the bond plane and for which the carrier utilized may be a highly stretchable, substantially nonresilient film. Adhesives employed are exclusively UV-crosslinked acrylate copolymers, with which it is not possible to achieve the high bond strengths, and which undergo a smaller loss of peel adhesion during stretching than is the case, for example, for adhesives based on vinyl aromatic block copolymer.

Further publications such as WO 2010/141248 A1 describe systems comprising polyisobutylene PSAs, which likewise exhibit low peel adhesion.

A strippable adhesive film strip having a foamed, nonadhesive film carrier is described in WO 95/06691 A1, DE 196 49 727 A1, DE 196 49 728 A1, DE 196 49 729 A1, and DE 198 20 858 A1. Because of the intermediate carrier of foam material, the adhesive film strip cannot have a low thickness of below 200 µm.

Foamed PSA systems have been known for some considerable time and are described in the prior art. In principle, polymer foams can be produced in two ways. One way is by the effect of a blowing gas, whether adding as such or resulting from a chemical reaction, and a second way is via incorporation of hollow spheres into the material matrix. Foams produced by the latter route are referred to as syntactic foams.

Compositions foamed using hollow microspheres are notable for a defined cell structure with a homogeneous size distribution of the foam cells. With hollow microspheres, closed-cell foams without cavities are obtained, the features of which include better sealing action against dust and liquid media when compared to open-cell variants. Furthermore, chemically or physically foamed materials have a greater propensity to irreversible collapse under pressure and temperature, and frequently show lower cohesive strength. Particularly advantageous properties can be achieved when the microspheres used for foaming are expandable microspheres (also referred to as "microballoons"). By virtue of their flexible, thermoplastic polymer shell, foams of this kind have a higher capacity to conform than those filled with nonexpendable, nonpolymeric hollow microspheres (for example, hollow glass spheres). They have better suitability for compensating manufacturing tolerances, of the kind generally affecting injection-molded parts, for example, and they are also better able to compensate thermal stresses, because of their foam character. Moreover, it is possible to exert further influence over the mechanical properties of the foam via the selection of the thermoplastic resin of the polymer shell. For example, even when the foam has a lower density than the matrix, it is possible to produce foams having higher cohesive strength than with the polymer matrix alone. For instance, typical foam properties such as the capacity to conform to rough substrates can be combined with a high cohesive strength for pressure-sensitive adhesive foams.

EP 0 257 984 A1 discloses adhesive tapes which at least on one side have a foamed adhesive coating. Contained within this adhesive coating are polymer spheres which in turn comprise a hydrocarbon liquid and which expand at elevated temperatures. The scaffold polymers of the PSAs may consist of rubbers or polyacrylates. The microballoons here are added either before or after the polymerization. The microballoon-containing PSAs are processed from solvent and are shaped to form adhesive tapes. The step of foaming takes place, logically, after the coating operation. In this way, micro-rough surfaces are obtained. This results in properties such as, in particular, repositionability. The effect of better repositionability by means of micro-rough surfaces of PSAs foamed using microballoons is also described in other specifications such as DE 35 37 433 A1 or WO 95/31225 A1. The micro-rough surface is used in order to produce bubble-free bonding. This use is also disclosed by EP 0 693 097 A1 and WO 98/18878 A1. PSAs foamed using microballoons are also known from specifications U.S. Pat. No. 4,885,170 A and EP 1 102 809 B, where they are employed, however, as a filler for adhesive tapes for permanent bonding which are not redetachable.

Among the devices in the consumer electronics industry are electronic, optical and precision devices, in the context of this application especially those devices as classified in Class 9 of the International Classification of Goods and Services for the Registration of Marks (Nice Classification), 10th edition (NCL(10-2013)), to the extent that these are electronic, optical or precision devices, and also clocks, watches and chronometers according to Class 14 (NCL(10-2013)), such as, in particular, Scientific, marine, metrological, photographic, film, optical, weighing, measuring, signaling, monitoring, rescuing and instruction apparatus and instruments Apparatus and instruments for conducting, switching, converting, storing, regulating and monitoring electricity Image recording, processing, transmission and reproduction devices, such as, for example, televisions and the like Acoustic recording, processing, transmission and reproduction devices, such as, for example, broadcasting devices and the like Computers, calculating instruments and data processing devices, mathematical devices and instruments, computer accessories, office instruments—such as, for example, printers, fax machines, copiers, word processors—, data storage devices Telecommunications devices and multifunction devices with a telecommunications function, such as, for example, telephones and answering machines Chemical and physical measuring devices, control devices and instruments, such as, for example, battery chargers, multimeters, lamps and tachometers Nautical devices and instruments Optical devices and instruments Medical devices and instruments and those for sports people Clocks, watches and chronometers Solar cell modules, such as electrochemical dye solar cells, organic solar cells and thin-film cells Fire extinguishing equipment.

The technical development is going increasingly in the direction of devices which are ever smaller and lighter in design, allowing them to be carried at all times by their owner, and usually being generally carried. This is accomplished usually by realization of low weights and/or suitable size of such devices. Such devices are also referred to as mobile devices or portable devices for the purposes of this specification. In this development trend, precision and optical devices are increasingly being provided (also) with electronic components, so raising the possibilities for minimization. Given that the mobile devices are carried, they are subject to increased loads, especially mechanical loads, as for instance by impact on edges, by being dropped, by contact with other hard objects in the pocket, or else simply by the permanent motion involved in being carried per se. Mobile devices, however, are also subject to a greater extent to loads due to moisture exposure, temperature influences and the like than those "immobile" devices which are usually installed in interiors and which are moved little or not at all.

The invention accordingly relates with particular preference to mobile devices, since the pressure-sensitive adhesive strip used in the invention has particular benefits here on account of its unexpectedly good properties (very high shock resistance, low susceptibility to tearing during extensive stretching, i.e., low susceptibility to tears). Listed below are a number of portable devices, without wishing the representatives specifically identified in this list to impose any unnecessary restriction on the subject matter of the invention.

Cameras, digital cameras, photographic accessories (such as light meters, flash guns, diaphragms, camera casings, lenses, etc.), film cameras, video cameras Small-scale computers (mobile computers, handheld computers, handheld calculators), laptops, notebooks, netbooks, ultrabooks, tablet computers, handhelds, electronic diaries and organizers (known as "Electronic Organizers" or "Personal Digital Assistants", PDAs, palmtops), modems Computer accessories and operating units for electronic devices, such as mice, drawing pads, graphics tablets, microphones, loudspeakers, games consoles, game pads, remote controls, remote operating devices, touchpads Monitors, displays, screens, touch-sensitive screens (sensor screens, touchscreen devices), projectors Reading devices for electronic books ("e-books")

Miniature TVs, pocket TVs, devices for playing films, video players

Radios (including miniature and pocket radios), Walkmans, Discmans, music players for e.g. CDs, DVDs, Blu-rays, cassettes, USB, MP3, headphones Corded telephones, mobile telephones, smartphones, two-way radios, hands-free devices, devices for summoning people (pagers, bleepers)

Mobile defibrillators, blood sugar meters, blood pressure monitors, step counters, pulse meters Torches, laser pointers Mobile detectors, optical magnifiers, monoculars and binoculars, night vision devices GPS devices, navigation devices, portable interface devices for satellite communications Data storage devices (USB sticks, external hard drives, memory cards)

Wrist watches, digital watches, pocket watches, chain watches, stopwatches.

For these devices, a particular requirement is for adhesive tapes that are removable easily as and when desired. In addition, it is important that the holding power of the adhesive tapes does not fail, especially when the electronic device—a cell phone, for example—is dropped and hits the ground. The adhesive strip must therefore have high shock resistance. DE 10 2015 206 076 A1 describes a pressure-sensitive adhesive strip of this kind with reduced detachment force and high shock resistance, which is redetachable without residue or destruction by extensive stretching substantially in the bond plane, which comprises one or more layers of adhesive all composed of a pressure-sensitive adhesive which is foamed using microballoons and is constructed in particular on the basis of vinyl aromatic block copolymers and tackifier resins, and which optionally consists of one or more intermediate carrier layers, with the pressure-sensitive adhesive strip consisting exclusively of the stated adhesive layers and optional intermediate carrier layers, and the one outer upper face and one outer lower face of the pressure-sensitive adhesive strip are formed by the stated layer or layers of adhesive.

DE 10 2012 223 670 A1 relates to a pressure-sensitive adhesive film strip composed of at least two, more particularly three, layers, which is redetachable, without residue or destruction, by extensive stretching substantially in the bond plane, which has a carrier that on at least one side bears a first, outer layer of adhesive, the layer of adhesive consisting of an adhesive which is constructed on the basis of vinyl aromatic block copolymers and tackifier resins, where to an extent of at least 75% (based on the total resin fraction) a resin is selected which has a DACP (diacetone alcohol cloud point) of greater than −20° C., preferably greater than 0° C., and the carrier has at least one layer which consists of a polyurethane with an elongation at break of at least 100% and a resilience of more than 50%. The carrier is therefore highly stretchable and to a large extent elastic. In addition, large parts of the tackifier resin are unable to migrate from the adhesive layer into the carrier, with positive consequences for the holding power.

US 2017/0218233 A1 relates to a pressure-sensitive adhesive tape comprising a substrate layer and layers of adhesive laminated on both sides of the substrate layer, where the thickness of the substrate layer is 25 µm to 500 µm and the substrate layer comprises a thermoplastic synthetic rubber and a reinforcement, and where the thickness of each adhesive layer is 10 µm to 240 µm, and the substrate layer comprises a thermoplastic synthetic rubber and a filler, where the filler is a particle having a diameter of 0.01 µm to 120 µm. The peel adhesion of the pressure-sensitive adhesive tape is 6,000 to 25,000 gf/20 mm, i.e., at least about 30 N/cm.

WO 2016/047436 A1 discloses a stretchable adhesive film which is used for a portable electronic device, the adhesive film comprising an adhesive layer which comprises filler particles.

A problem of the strippable pressure-adhesive tapes from the prior art, however, is that especially when pulled off at an angle of at least 45° with respect to the bond plane, such as, for example, 90° with respect to the bond plane, they frequently tear. Detachment is then generally no longer possible, since the remnant of the adhesive strip springs back into the bond line and there is therefore no longer a finger tab available. This is the case, for example, with the commonly employed adhesives based on vinyl aromatic block copolymer even where they are used in an assembly with polyurethane carriers onto which they have been coated. However, especially in mobile devices, such as mobile telephones, for example, there is increasingly less space available when pulling off the strippable pressure-adhesive tapes, meaning that there is a demand for strippable pressure-sensitive adhesive tapes which can be pulled off even at an angle of at least 45°, such as 90°, for example, with respect to the bond plane, without tearing. One example is the use of such strippable pressure-sensitive adhesive tapes in battery mounting. There is also a demand for strippable pressure-sensitive adhesive tapes whose shock resistance is further improved.

There is therefore an ongoing need for strippable pressure-sensitive adhesive strips which have high resistance to tears, typically even at a pull-off angle of at least about 45° with respect to the bond plane. The pressure-sensitive adhesive strips, moreover, are preferably to be smooth, to have high peel adhesion, to exhibit a high tack (i.e., a high touch-stickiness) and/or to be shock-resistant.

The objectives described are achieved by a pressure-sensitive adhesive strip as defined in claim 1. Claim 1 relates to a pressure-sensitive adhesive strip (PSA strip) which is redetachable, without residue or destruction, by extensive stretching substantially in the bond plane, i.e., at a peel angle of about 0°, comprising one or more layers of pressure-sensitive adhesive (PSA layers) and optionally one or more intermediate carrier layers, where at least one of the PSA layers comprises at least one filler which can be separated into its primary particles, the primary particles (i) being substantially spherical and (ii) having a median diameter d(0.5) as per Test Method 2 of less than 10 μm. Moreover, the ratio of the median diameter d(0.5) of the primary particles to the thickness of the PSA layer containing the primary particles is less than 1:2. Such fillers increase the tear resistance of the PSA strip, while the technical adhesive properties, such as the tack or the peel adhesion, and the shock resistance, such as the penetrative impact strength or transverse impact strength, remain typically substantially unchanged, this being surprising and advantageous. The fillers of the invention typically lower the tack, the peel adhesion, the penetrative impact strength and/or the shock resistance of the PSA strip by not more than 30%, preferably not more than 20%, and more particularly not more than 10%, relative to the PSA strip having otherwise an identical composition but not containing the stated filler. The term "tack" refers in accordance with the invention in particular to the probe tack. The fillers of the invention also have the advantage of ease of handling and meterability. Preferred embodiments of the PSA strip are contained in the dependent claims.

The present invention further relates to a method for producing a PSA strip of the invention, where the PSA strip is produced by means of a solvent-based coating method or hotmelt coating method.

The present invention also relates to the use of at least one pressure-sensitive adhesive (PSA) which comprises at least one filler which can be separated into its primary particles, the primary particles (i) being substantially spherical and (ii) having a median diameter d(0.5) of less than 10 μm, in a PSA strip which is redetachable, without residue or destruction, by extensive stretching substantially in the bond plane, comprising one or more PSA layers and optionally one or more intermediate carrier layers, where the ratio of the median diameter d(0.5) of the primary particles to the thickness of the PSA layer containing the primary particles is less than 1:2.

The invention additionally relates to the use of a PSA strip of the invention for bonding electronic components such as, in particular, rechargeable batteries and electronic devices such as, in particular, cell phones.

A pressure-sensitive adhesive (PSA) or PSA composition is understood in the invention, and customarily in the general usage, as a material which at least at room temperature is permanently tacky and also adhesive. A characteristic of a PSA is that it can be applied by pressure to a substrate and remains adhering there, with no further definition of the pressure to be applied or the period of exposure to this pressure. In general, though in principle dependent on the precise nature of the PSA and also on the substrate, the temperature, and the atmospheric humidity, the influence of a minimal pressure of short duration, which does not go beyond gentle contact for a brief moment, is enough to achieve the adhesion effect, while in other cases a longer-term period of exposure to a higher pressure may also be necessary.

PSAs have particular, characteristic viscoelastic properties which result in the permanent tack and adhesiveness. The feature of these adhesives is that when they are mechanically deformed, there are processes of viscous flow and there is also development of elastic forces of recovery. The two processes have a certain relationship to one another in terms of their respective proportion, depending not only on the precise composition, the structure, and the degree of crosslinking of the PSA, but also on the rate and duration of the deformation, and on the temperature. The proportional viscous flow is necessary for the achievement of adhesion. Only the viscous components, brought about by macromolecules with relatively high mobility, permit effective wetting and effective flow onto the substrate where bonding is to take place. A high viscous flow component results in high tack (also referred to as surface stickiness), and hence often also in a high peel adhesion. Highly crosslinked systems, crystalline polymers, or polymers with glasslike solidification lack flowable components and are in general devoid of tack or possess only little tack at least.

The proportional elastic forces of recovery are necessary for the achievement of cohesion. They are brought about, for example, by very long-chain macromolecules with a high degree of coiling, and also by physically or chemically crosslinked macromolecules, and they allow the transmission of the forces that act on an adhesive bond. As a result of these forces of recovery, an adhesive bond is able to withstand a long-term load acting on it, in the form of a sustained shearing load, for example, to a sufficient degree over a relatively long time period.

For a more precise description and quantification of the extent of elastic and viscous components, and also of the relationship between the components, the variables of storage modulus (G') and loss modulus (G") are employed, and can be determined by dynamic mechanical analysis (DMA). G' is a measure of the elastic component, G" a measure of the viscous component, of a substance. Both variables are dependent on the deformation frequency and the temperature.

The variables can be determined using a rheometer. In that case, for example, the material under investigation is exposed in a plate/plate arrangement to a sinusoidally oscillating shear stress. In the case of instruments operating with shear stress control, the deformation is measured as a function of time, and the time offset of this deformation is measured relative to the introduction of the shear stress. This time offset is referred to as the phase angle δ.

The storage modulus G' is defined as follows: $G'=(\tau/\gamma)\cdot\cos(\delta)$ (τ=shear stress, γ=deformation, δ=phase angle=phase shift between shear stress vector and deformation vector). The definition of the loss modulus G" is as follows: $G''=(\tau/\gamma)\cdot\sin(\delta)$ (τ=shear stress, γ=deformation, δ=phase angle=phase shift between shear stress vector and deformation vector).

A composition is considered in general to be a PSA, and is defined as such for the purposes of the invention, when at 23° C., in the deformation frequency range from $10^0$ to $10^1$ rad/sec, both G' and G" are situated at least partly in the range from $10^3$ to $10^7$ Pa. "Partly" means that at least a section of the G' curve lies within the window subtended by the deformation frequency range from $10^0$ inclusive up to $10^1$ inclusive rad/sec (abscissa) and by the G' value range from $10^3$ inclusive to $10^7$ inclusive Pa (ordinate), and when at least one section of the G" curve is likewise situated within the corresponding window.

For relevantly known, strippable PSA strips to be redetachable easily and without residue, they are required to possess certain technical adhesive properties: on stretching, the tack of the PSA strips must drop significantly. The lower the bonding performance in the stretched state, the less the extent to which the substrate is damaged during detachment. This property is particularly evident in adhesives based on vinyl aromatic block copolymers, for which the tack drops to below 10% in the vicinity of the yield point.

For strippable PSA strips to be redetachable easily and without residue, they are required to have certain mechanical properties in addition to the technical adhesive properties described above. With particular advantage, the ratio of the tearing force to the stripping force is greater than two, preferably greater than three. The stripping force here is the force which has to be expended in order to part an adhesive strip from a bond line again, by parallel pulling in the direction of the bond plane. This stripping force is made up of the force which is needed, as described above, to detach the adhesive strip from the bond substrates, and of the force which must be expended in order to cause deformation of the adhesive strip. The force needed for deformation of the adhesive strip is dependent on the thickness of the PSA strip. The force required for detachment, in contrast, within the thickness range of the PSA strip under consideration (20 to 3000 μm), is independent of the thickness of the adhesive strips.

The easy and residue-free redetachability of the strippable PSA strips may be controlled accordingly in particular by way of the chemical composition of the PSAs used, and so, in the case of a suitable chemical composition of the PSA, even a thin PSA layer can have the desired redetachability. The redetachability can further also be controlled by the thickness of the PSA strip. Moreover, a suitable intermediate carrier may also beneficially influence the desired redetachability.

On extensive stretching at a peel angle of about 45° relative to the bond plane, the PSA strip of the invention typically has a tearing susceptibility of less than 50%, preferably of less than 30%, more preferably of less than 20%, more preferably still of less than 10%, and more particularly of less than 5%, determined in each case by Test Method 9.

In another preferred embodiment, on extensive stretching at a peel angle of about 90° relative to the bond plane, the PSA strip preferably has a tearing susceptibility of less than 50%, more preferably less than 30%, more preferably still of less than 20%, and more particularly of less than 10%, determined in each case according to Test Method 9.

At least one PSA layer of the PSA strip comprises at least one filler which can be separated into its primary particles. The term "can be separated into its primary particles" here means that the primary particles, if they are not present in separated form from the outset, can be separated by exposing the (polymer) matrix to shear. The meaning of the term "filler which can be separated into its primary particles" therefore also embraces filler particles present in agglomerated form. "Present in agglomerated form" means that the primary particles forming the agglomerate are held together only by weak forces, generally electrostatic forces, brought about by charge or polarity. To be distinguished from this, and not encompassed by the meaning of the term "can be separated into its primary particles", are filler particles which are present in aggregated form. "Present in aggregated form" means that the primary particles forming the aggregate are held together by strong forces, brought about generally by covalent or ionic bonds. Such aggregates are very difficult to break up into smaller units, particularly not by shearing forces acting on the (polymer) matrix.

In particular, the filler comprises separate primary particles. Separate primary particles have no unmediated contact with another primary particle. "Unmediated contact" here describes a direct—not interrupted by the matrix—bordering of the interfaces of two primary particles. In particular, primary particles present in aggregated form are not embraced by the terms "can be separated into its primary particles" and "separate". Especially not embraced by the terms are ramified or dendritic structures, as are formed by fumed silicas, for example. The separate distribution of the primary particles of filler in the PSA strip may be determined using techniques of electron microscopy such as SEM (scanning electron microscopy) or TEM (transmission electron microscopy).

"Primary particles" are understood, in line with the understanding of the skilled person, as being filler particles which are recognizable as individuals by suitable physical techniques such as optical microscopy or electron microscopy in accordance with DIN 53206-1: 1972-08.

The filler particles of the invention are preferably not composed of concentric layers. "Composed of concentric layers" means that starting from the center point of the particle in every direction of space there is a sequence of layers each composed of different material. Therefore, in particular, the filler particles of the invention can preferably be delimited from filler particles known as core-shell particles, which comprise a core composed of one particular solid material and a shell composed of a different solid material. Inclusions of liquids or gases are not ruled out for the filler particles of the invention; liquids and gases are not considered "layers" in the above sense. The primary particles of the filler of the invention which can be separated into its primary particles are preferably solid bodies. For the purposes of the present specification, moreover, surface-treated primary particles are not deemed to be primary particles composed of concentric layers.

"Spherical particles" are understood to be particles having an aspect ratio of the lengths of shortest axis $L_{min}$ to longest axis $L_{max}$ of greater than 0.5. The definition of these lengths is subject to the following considerations:

Let the center point of the particle be the geometric volume center of gravity. The axes compared for the purpose of describing the sphericity are those which run through this center point and connect two points on the surface of the particle. There is at least one shortest axis with the length $L_{min}$ and at least one longest axis with the length $L_{max}$. The sphericity of the particle, then, is defined as the dimensionless aspect ratio $L_{min}/L_{max}$ and is greater than 0 (zero) and less than or equal to 1. In the case of perfect sphericity, the ratio attains the value of 1. Surface roughnesses, of the kind normally occurring in the production of the particles, are immaterial in the context of the parameters dealt with here.

"Spherical particles" are understood in accordance with the remarks above to be those which have an aspect ratio >0.5, preferably >0.65, more preferably >0.85. In particular the primary particles are substantially sphere-shaped, and very particularly preferably they are substantially spheres.

Suitable measurement techniques, depending on particle size, are optical techniques, e.g., CAMSIZER®, Retsch GmbH, Germany, or electron microscopy.

In the invention the primary particles are substantially spherical. "Substantially" here means that typically at least 90% (i.e., at least 90 out of 100 particles) of the primary particles are spherical in the sense of the definition above. Preferably at least 95% (i.e., at least 95 out of 100 primary particles) are spherical, and more preferably all of the primary particles are spherical.

The primary particles of the filler preferably have a median diameter d(0.5) as per Test Method 2 of 10 μm to 1 μm, more preferably of 30 nm to 500 nm, more preferably still of 50 nm to 250 nm and more particularly of 100 to 200 nm, such as, for example, of 150 nm. Likewise preferably the ratio of the median diameter d(0.5) of the primary particles to the thickness of the PSA layer containing the primary particles is less than 1:5, preferably less than 1:10, more preferably less than 1:30, more preferably still less than 1:50, and more particularly less than 1:100. With such particle sizes and ratios of particle size to layer thickness, the resulting profiles of properties of the PSA strip are particularly advantageous, especially in relation to the tear resistance. Layer thicknesses and the thickness of PSA strips are ascertained in the invention using Test Method 3.

The median diameter d(0.5) of the primary particles is determined in the invention by laser diffraction on a suspension of the filler particles in deionized water, on the basis of the distribution curve of proportional volume plotted over the particle size (Test Method 2). If the primary particles in the suspension are not separate from the outset, they can be separated prior to the measurement by the action of shear on the suspension. Here, d(0.5) is defined as the particle size value for which the summated volume fractions reach 0.5, i.e., 50%. The median diameter is determined in particular by laser diffraction with a darkening of 17±1%. Using the specified technique, the median diameter may be determined using commercially customary instruments intended for this purpose, for example using the "Mastersizer" line from Malvern (e.g., Mastersizer 2000, Mastersizer 3000).

The filler particles are preferably inert. For example they have preferably no photocatalytic properties. They also preferably have a very small fraction of ionic soluble constituents.

The material of the filler particles of the invention comprises plastics, other organic compounds, including, in particular, biobased compounds, and also inorganic materials, more particularly glasslike or ceramic materials. The primary particles of the at least one filler which can be separated into its primary particles consist preferably of an inorganic material. More particularly the particles are silicon dioxide particles.

With further preference the primary particles of the filler which can be separated into its primary particles do not have any surface functionalization. This advantageously facilitates the production and provision of these particles.

The filler which can be separated into its primary particles preferably has a specific surface area (BET) of <50 m²/g. A sphericity measure may also be expressed through the ratio of specific surface area (BET, in m²/g) to the median diameter d(0.5) (in nm). This ratio is preferably <1.0 m²/(g*nm) for the spherical particles of the filler of the invention.

Examples of commercially available fillers of the invention are as follows:

Sidistar® T120U, whose spherical amorphous silicon dioxide primary particles have a d(0.5) of 150 nm, available from Elkem ASA. Sidistar® T120U is a filler which can be separated into its primary particles, the primary particles being substantially spherical and additionally not being composed of concentric layers. The product enables excellent distribution of the particles in the polymer matrix. This leads to an improved dispersion of all the composed constituents and to a better flow behavior, hence enabling higher extrusion rates and a smoother surface of the end product, i.e., the layer containing the particles. The product is supplied in undiluted form.

Kronos 2360, whose spherical titanium dioxide primary particles have a d(0.5) of about 600 nm, available from Kronos. KRO 2360 is likewise a filler which can be separated into its primary particles, the primary particles being substantially spherical.

SiLibeads, i.e., polished, round, solid glass beads made of soda-lime glass, with a size distribution (diameter) of 0 to 20 μm, with the median diameter d(0.5) being 7 μm. The sphericity is >=0.89. This type of SiLibeads is therefore in accordance with the invention. The SiLibeads are obtained from Sigmund Lindner GmbH. SiLibeads are likewise fillers which can be separated into their primary particles, the primary particles being substantially spherical and, in addition, not being composed of concentric layers.

The filler of the invention is present in the PSA layer typically at up to 50 wt %, preferably up to 30 wt %, more preferably up to 25 wt %, more preferably still up to 20 wt %, and more particularly up to 15 wt %, and preferably at not less than 2 wt %, more preferably not less than 4 wt %, and more particularly not less than 7 wt %, based in each case on the total weight of the PSA layer. Filler contents of these kinds are particularly beneficial to the tear resistance. If filler contents are too high, moreover, there is a possibility of deterioration in the technical adhesive properties such as peel adhesion or tack. The filler used may in principle also be a mixture of two or more fillers of the invention, in which case the preferred weight fractions are based on the total amount of filler of the invention.

The filler of the invention is contained in at least one PSA layer. In multilayer constructions it may be contained in an inner layer and/or in the outer layers.

In one preferred embodiment, one or more PSA layers, preferably one or more of the PSA layers containing the filler which can be separated into its primary particles, comprise a further, preferably inorganic, filler which is not in accordance with the invention, i.e., is not as defined in claim 1. The further filler or fillers are contained in the PSA layer preferably at 5 to 75 wt %, based on the total weight of said PSA layer.

In another preferred embodiment the one or more PSA layers containing the filler which can be separated into its primary particles do not comprise any further fillers which are not in accordance with the invention.

In one preferred embodiment of the invention, at least one PSA layer, preferably all the PSA layers, of the PSA strip of the invention is or are based on synthetic rubber such as, more particularly, vinyl aromatic block copolymer. A PSA layer based on synthetic rubber such as, more particularly, vinyl aromatic block copolymer typically means in accordance with the invention that the corresponding synthetic rubber accounts preferably for at least 90 wt % of the polymer present in the PSA layer. Tackifier resins are not considered polymers in this context.

If a PSA layer is based on vinyl aromatic block copolymer, then the vinyl aromatic block copolymer preferably comprises (i) polymer blocks predominantly formed by polymerization of vinyl aromatics (A blocks), preferably styrene, and at the same time (ii) polymer blocks predominantly formed by polymerization of conjugated dienes having 4 to 18 carbon atoms and/or isobutylene (B blocks), preferably of 1,3-dienes such as, for example, butadiene, where the B blocks are optionally at least partly, such as, for example, completely, hydrogenated. If polymer blocks are predominantly formed by polymerization of a particular monomer, this means in accordance with the invention that said monomer at polymerization has a molar fraction of more than 50 mol %, with at least 90 mol % and especially (virtually) 100 mol % being preferred.

The block copolymers of the PSAs preferably possess polystyrene end blocks as A blocks. In place of the preferred polystyrene blocks, it is also possible for vinyl aromatics used to comprise polymer blocks based on other aromatic-containing homo- and copolymers (preferably C8 to C12 aromatics) having glass transition temperatures (as per Test Method 1) of greater than 75° C., such as, for example, α-methylstyrene-containing aromatic blocks. In addition there may also be identical or different A blocks present.

Preferred conjugated dienes as monomers for the soft block B are especially selected from the group consisting of butadiene, isoprene, ethylbutadiene, phenylbutadiene, piperylene, pentadiene, hexadiene, ethylhexadiene, dimethylbutadiene, and the farnesene isomers, and also any desired mixtures of these monomers. The block B may also be in the form of a homopolymer or copolymer. Particularly preferred as conjugated diene monomer for the soft block B is butadiene. The soft block B, for example, is a polybutadiene or a partly or fully hydrogenated derivative thereof such as polybutylene-butadiene in particular.

A blocks are also referred to in the context of this invention as "hard blocks". B blocks are correspondingly also called "soft blocks" or "elastomer blocks". This is reflected by the inventive selection of the blocks in accordance with their glass transition temperatures as per Test Method 1 (for A blocks typically at least 40° C., more particularly at least 60° C., and for B blocks typically up to at most –80° C., more particularly at most –50° C. or at most –20° C.). These figures are based on the pure, unblended block copolymers.

Typically at least one vinyl aromatic block copolymer of the PSA layer has at least two A blocks and at least one B block, such as, for example, a triblock copolymer A-B-A. The vinyl aromatic block copolymer of the PSA layer preferably comprises triblock copolymer A-B-A, plus diblock copolymer A-B and/or additionally multiblock copolymer, i.e., block copolymer having at least four polymer blocks, comprising more particularly at least three A blocks and at least one B block (such as, for example, more preferably radial block copolymers). Diblock copolymers contribute to tack and flowability of the adhesive. Triblock and multiblock copolymers contribute to cohesion and tensile strength of the adhesive. Two or more different diblock copolymers may be used. Two or more triblock and/or multiblock copolymers may be used. In a PSA layer based on vinyl aromatic block copolymer, the fraction of diblock copolymer relative to the total block copolymer content is preferably 10 to 65 wt %, more preferably 12 to 55 wt %, more preferably still 15 to 45 wt %, and more particularly 15 to 30 wt %. Significantly higher diblock fractions lead typically to inadequate cohesion, which is manifested in reduced holding power and/or reduced tear strength during the detachment process carried out with extensive stretching. A minimum fraction of triblock or multiblock is therefore required, for example to achieve sufficient cohesion, (thermal) shear strength and breaking strength. Substantially lower diblock fractions lead to a drop in bond strength, particularly on nonpolar substrates such as nonpolar paint, for example. Nevertheless it is also possible to do entirely without diblock copolymers.

In one particularly preferred embodiment the vinyl aromatic block copolymer consists substantially, i.e., to an extent of at least 90 wt %, such as completely, for example, of diblock copolymer A-B and triblock copolymer A-B-A.

In another particularly preferred embodiment, the vinyl aromatic block copolymer comprises radial block copolymer $(A-B)_nX$ or $(A-B-A)_nX$, especially $(A-B)_nX$, in which in each case X is the radical of the coupling reagent or initiator and n is an integer ≥3, where the fraction of the radial block copolymer in relation to the total block copolymer content is preferably more than 10 wt %, more preferably more than 30 wt %, and more particularly more than 50 wt %. The radial fraction is beneficial in particular to the thermal shear strength.

The fraction of vinyl aromatic block in the block copolymers may be different from one block copolymer type to another in the formulation, but is typically at least 15 wt %, preferably at least 25 wt %, and at most 40 wt %, preferably at most 35 wt %. Too low a polyvinyl aromatic fraction leads to inadequate physical crosslinking brought about by microphase separation. The physical crosslinking is important for the holding power and the tear strength. If the polyvinyl aromatic fraction is too high, on the other hand, the adhesive loses tack.

In one embodiment the PSA layer of the invention comprises at least one tackifier resin. The term "tackifier resin" is understood by the skilled person to refer to a resin-based substance which increases the tack. For the purposes of the present specification, tackifier resins are not considered to be polymers. Tackifier resins are typically oligomeric and polymeric compounds having a number-average molecular weight $M_n$ of not more than 5,000 g/mol. PSAs based on vinyl aromatic block copolymer generally comprise not only the vinyl aromatic block copolymer but also tackifier resin, in order to increase the adhesion in a desired way. The tackifier resin ought to be compatible with the elastomer block of the block copolymers.

It has been found that tackifier resins which can be used advantageously for the PSA composition(s), particularly for the vinyl aromatic block copolymer-based PSA composition(s), are preferably nonpolar hydrocarbon resins, examples being hydrogenated and nonhydrogenated polymers of dicyclopentadiene, nonhydrogenated, partly, selectively or fully hydrogenated hydrocarbon resins based on C5, C5/C9 or C9 monomer streams, and polyterpene resins based on α-pinene and/or β-pinene and/or δ-limonene. Aforesaid tackifier resins may be used either alone or in a mixture. Polyterpene resins are especially preferred particularly for SBS. For SIS, hydrogenated C5 or C9 resins as well are very suitable. Resins used here may be either solid or liquid at room temperature. Tackifier resins, hydrogenated or unhydrogenated, which also contain oxygen may be employed optionally—in the case of a PSA based on vinyl aromatic block copolymer, preferably at up to a maximum fraction of 25%, based on the total mass of the tackifier resins in the adhesive—with corresponding examples being rosin and/or rosin ester resins and/or terpene-phenolic resins, especially terpene-phenolic resins. One preferred embodiment has the PSA layers containing 20 to 60 wt % of at least one tackifier resin, based on the total weight of the layer of self-adhesive composition, preferably 30 to 50 wt % of at least one tackifier resin, based on the total weight of the PSA layer. The fraction of the plasticizers employable optionally at room temperature, such as liquid resins, for example, according to one preferred variant is up to 15 wt %, preferably up to 10 wt %, based on the total self-adhesive composition. Plasticizers have the capacity typically to increase in particular the peel adhesion and the tack, but may be detrimental to the cohesion and/or tear resistance. To increase the tear resistance, in particular, therefore, in one preferred embodiment the PSAs of the invention contain no plasticizers such as liquid resin, for example.

In one preferred embodiment of the PSA strip of the invention one or more layers are foams. At least one PSA layer and/or intermediate carrier layer may be a foam; preferably at least one PSA layer is a foam. For example, one or more of the PSA layers containing the filler which can be separated into its primary particles may be foams. Foams are able in particular to increase the shock resistance of the PSA strip. In multilayer constructions an inner layer and/or the outer layers may be a foam. Preferably the outer layers are a foam, this possibly being particularly advantageous for the shock resistance and possibly also bringing advantages associated with the bonding of uneven substrates.

The foam may be either a foam generated with hollow bodies, more particularly with micro-sized hollow bodies, or a foam generated using gas. Hollow bodies are not considered here to be fillers in accordance with the present invention. Accordingly, the foam layer—if foamed using hollow bodies—may be a syntactic foam, and—if foamed using a gas—it may also be a non-syntactic foam; a hybrid form is also conceivable. The gas needed where appropriate for foaming may be either introduced directly as blowing gas into the composition during production of the foam, or may be generated in the composition by chemical reaction of components present in said composition. The foam layer is preferably a foam generated using micro-sized hollow bodies. The foam layer preferably comprises hollow polymer beads, hollow glass beads, hollow ceramic beads, at least partially expanded microballoons, or a mixture thereof, and more particularly at least partially expanded microballoons.

The density of a foam layer of the invention is preferably 350 to 990 kg/m$^3$, more preferably 450 to 970 kg/m$^3$, more particularly 500 to 900 kg/m$^3$, as determined by Test Method 4. "Microballoons" are understood to be hollow microspheres which are elastic and therefore expandable in their base state, which have a thermoplastic polymer shell. These spheres are filled with low-boiling liquids or liquefied gas. Shell materials used include, in particular, polyacrylonitrile, PVDC, PVC or polyacrylates. Customary low-boiling liquids are, in particular, hydrocarbons of the lower alkanes, for example isobutane or isopentane, which are included in the form of liquefied gas under pressure in the polymer shell.

Exposing the microballoons, in particular exposing them to heat, causes the outer polymer shell to soften. At the same time, the liquid blowing gas present within the shell undergoes a transition into its gaseous state. The microballoons undergo irreversible expansion, expanding three-dimensionally. Expansion is at an end when the internal pressure matches the external pressure. Because the polymeric shell is retained, the result is a closed-cell foam.

The term "at least partly expanded microballoons" is understood in the invention to mean that the microballoons have expanded at least to a point that they produce a reduction in density of the composition to a technically meaningful extent in comparison with the same composition containing the unexpanded microballoons. This means that the microballoons need not necessarily have undergone complete expansion. The expression "at least partly expanded" relates to the expansion status of the individual microballoons and is not intended to mean that only some of the microballoons in question must have undergone (insipient) expansion. If, therefore, as preferred in the invention, "0.1 to 10 wt % of at least partly expanded microballoons" are present in the composition, this means that all of these "0.1 to 10 wt % of at least partly expanded microballoons" are at least partly expanded in the above sense, and unexpanded microballoons do not belong to the "0.1 to 10 wt % of at least partly expanded microballoons".

A multiplicity of types of microballoon are available commercially, and differ essentially in their size (6 to 45 µm diameter in the unexpanded state) and in the onset temperatures they require for expansion (75 to 220° C.). An example of commercially available microballoons are the Expancel® DU products (DU=dry unexpanded) from Akzo Nobel. Unexpanded microballoon products are also available as aqueous dispersions with a solids fraction or microballoon fraction of around 40 to 45 wt %, and are also available as polymer-bounded microballoons (masterbatches), in ethylene-vinyl acetate, for example, with a microballoon concentration of around 65 wt %. Not only the microballoon dispersions but also the masterbatches, like the unexpanded microballoons, are suitable as such for producing foams of the invention.

A foamed composition can also be generated using what are called pre-expanded microballoons. With this group, the expansion takes place even before incorporation into the polymer matrix. Pre-expanded microballoons are available commercially, for example, under the designation Dualite® or with the product designation Expancel DE (Dry Expanded) from Akzo Nobel.

In accordance with the invention, at least 90% of all the voids formed by microballoons preferably have a maximum diameter of 10 to 200 µm, more preferably of 15 to 200 µm. The "maximum diameter" refers to the maximum extent of a microballoon in the observation plane. The diameters are determined on the basis of a cryofracture edge in a scanning electron microscope (SEM) at 500-times magnification. The diameter of each individual microballoon is determined graphically.

The fraction of the microballoons in the composition according to one preferred embodiment of the invention is 0.1 wt % to 10 wt %, more preferably 0.25 wt % to 5 wt %, more preferably still 0.5 to 3 wt %, and more particularly 1 to 2.0 wt %, based in each case on the total constitution of the composition.

The PSAs of the invention may include further additives in order to evoke certain properties or to emphasize said properties. The PSA of the invention, particularly one based on vinyl aromatic block copolymer, may comprise, for example, aging inhibitors (such as primary or secondary antioxidants or light stabilizers). Also conceivable, for example, are plasticizing agents, processing agents, end block reinforcer resins, dyes, pigments, flame retardants and/or further polymers of preferably elastomeric in nature. Elastomers utilizable accordingly include, among others, those based on pure hydrocarbons, examples being unsaturated polydienes such as natural or synthetically produced polyisoprene or polybutadiene, chemically substantially saturated elastomers such as, for example, saturated ethylene-propylene copolymers, α-olefin copolymers, polyisobutylene, butyl rubber, ethylene-propylene rubber, and also chemically functionalized hydrocarbons, such as halogen-containing, acrylate-containing, allyl or vinyl ether-containing polyolefins, for example. Moreover, the PSAs may also comprise crosslinkers.

In one preferred embodiment the PSA strip consists of a single PSA layer. As described above, this layer comprises at least one filler which can be separated into its primary particles, as defined in claim 1. Moreover, it may comprise further filler which is not as defined in claim 1. The PSA strip consisting of a single PSA layer is preferably a foam. Alternatively the PSA strip consisting of a single PSA layer is unfoamed.

In a further embodiment, the PSA strip consists of at least two, such as, for example, exactly three, layers. In this embodiment, therefore, the construction is a multilayer construction. In the case of a PSA strip composed of exactly two layers, typically two PSA layers are arranged one atop another. In the case of a PSA strip composed of exactly three layers, typically either three PSA layers are arranged one atop another, or a PSA layer is arranged on each of the two surfaces of an intermediate carrier layer. For the purposes of the present invention, accordingly, a PSA layer is not an intermediate carrier layer.

In the multilayer constructions described above, preferably at least one layer, more preferably at least two layers, has or have a thickness of less than 50 µm, and optionally at least one further layer has a thickness of more than 30 µm. In the field of consumer electronics in particular, adhesive strips are preferred which are extremely thin, since the end devices are to be extremely thin and therefore all of the individual components as well are to take up little space.

In the multilayer constructions, at least one PSA layer may be a foam, preferably the outer layers. Moreover, at least one PSA layer comprises at least one filler which can be separated into its primary particles, as defined in claim 1. In the three-layer construction preferably the inner PSA layer, and also, optionally, the outer layers, comprises or comprise said filler. At least one of the PSA layers, moreover, may comprise further filler which is not as defined in claim 1.

In one possible embodiment, accordingly, the PSA strip consists of two outer foamed PSA layers which comprise filler of the invention, and also one unfoamed inner PSA layer.

In another possible embodiment, the PSA strip consists of two outer foamed PSA layers and also one unfoamed inner PSA layer which comprises filler of the invention.

In a further possible embodiment, the PSA strip consists of two outer foamed PSA layers which comprise filler of the invention, and also an unfoamed inner PSA layer which comprises filler of the invention.

In another possible embodiment, the PSA strip consists of two outer foamed PSA layers which comprise filler of the invention, and also a nonadhesive intermediate carrier layer.

PSA strips of the invention typically have a thickness of less than 3000 µm, preferably of less than 800 µm, more preferably of less than 500 µm, and more particularly of less than 300 µm.

The PSA strip may optionally comprise at least one intermediate carrier, arranged either in a layer of adhesive or between two layers of adhesive. This carrier is typically a film carrier. More preferably the intermediate carrier consists only of a single layer of a polymer film. The thickness of the intermediate carrier layer is typically 10 to 200 µm, such as, in particular, 20 to 60 µm.

The inventive concept encompasses constructions having an extensible intermediate carrier in the interior of the PSA strip, in which case the extensibility of the intermediate carrier must be sufficient to ensure detachment of the adhesive strip by extensive stretching, substantially in the bond plane and typically also at a peel angle of at least 45° relative to the bond plane. Examples of possible intermediate carriers include highly extensible films. Examples of extensible intermediate carriers which can be used advantageously are transparent versions, from DE 10 2012 223670 A1, WO 2009/114683 A1, WO 2010/077541 A1, WO 2010/078396 A1.

The intermediate carrier film is produced using film-forming or extrudable polymers, which may additionally have undergone monoaxial or biaxial orientation.

In one preferred version, polyolefins are used. Preferred polyolefins are prepared from ethylene, propylene, butylene and/or hexylene, and in each case the pure monomers may be polymerized or mixtures of the stated monomers may be copolymerized. Through the polymerization process and through the selection of the monomers it is possible to direct the physical and mechanical properties of the polymer film, such as the softening temperature and/or the tear strength, for example.

Polyurethanes, furthermore, may be used advantageously as starting materials for extensible intermediate carrier layers. Polyurethanes are chemically and/or physically cross-linked polycondensates, typically constructed from polyols and isocyanates. Depending on the nature of the individual components and the proportion in which they are used, extensible materials are obtainable which can be used advantageously in the context of this invention. The skilled person is aware of further raw materials from which intermediate carrier layers of the invention may be constructed. It is advantageous, additionally, to use rubber-based materials in intermediate carrier layers in order to produce extensibility. As rubber or synthetic rubber or blends produced therefrom, as starting material for extensible intermediate carrier layers, the natural rubber may be selected in principle from all available grades such as, for example, crepe, RSS, ADS, TSR or CV products, depending on the required levels of purity and viscosity, and the synthetic rubber or synthetic rubbers may be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) and polyurethanes and/or blends thereof.

Employable with particular advantage as materials for extensible intermediate carrier layers are block copolymers. In these copolymers, individual polymer blocks are linked covalently to one another. The block linkage may be in a linear form, or else in a star-shaped or graft copolymer variant. One example of an advantageously employable block copolymer is a linear triblock copolymer whose two terminal blocks have a glass transition temperature of at least 40° C., preferably at least 70° C., and whose middle block has a glass transition temperature of not more than 0° C., preferably not more than −30° C. Higher block copolymers, such as tetrablock copolymers, are likewise employable. It is important that in the block copolymer there are at least two polymer blocks of identical or different kind which have a glass transition temperature in each case of at least 40° C., preferably at least 70° C., and which are separated from one another in the polymer chain via at least one polymer block having a glass transition temperature of at most 0° C., preferably at most −30° C. The glass transition temperatures are determined in each case by Test Method 1. Examples of polymer blocks are polyethers such as polyethylene glycol, polypropylene glycol or polytetrahydrofuran, polydienes, such as polybutadiene or polyisoprene, hydrogenated polydienes, such as polyethylene-butylene or polyethylene-propylene, polyesters, such as polyethylene terephthalate, polybutanediol adipate or polyhexanediol adipate, polycarbonate, polycaprolactone, polymer blocks of vinyl aromatic monomers, such as polystyrene or poly-[α]- methylstyrene, polyalkyl vinyl ethers, polyvinyl acetate, polymer blocks of [α],[β]-unsaturated esters such as, in particular, acrylates or methacrylates, for example. The skilled person knows of corresponding glass transition temperatures. Alternatively the skilled person can look them up in, for example, the Polymer Handbook [J. Brandrup, E. H. Immergut, E. A. Grulke (eds.), Polymer Handbook, 4th ed. 1999, Wiley, New York]. Polymer blocks may be composed of copolymers.

To produce an intermediate carrier material it may be appropriate here as well to add additives and further components which enhance the film-forming properties, which reduce the tendency for crystalline segments to form, and/or which specifically improve or else, where appropriate, impair the mechanical properties.

Furthermore, foam materials in web form (for example, made from polyethylene and polyurethane) are suitable.

The intermediate carriers may have a multi-ply architecture. Furthermore, the intermediate carriers may have outer layers, barrier layers for example, which prevent penetration of components from the adhesive into the intermediate carrier, or vice versa. These outer layers may also have barrier properties, so as to prevent diffusion of water vapor and/or oxygen through the layer.

For more effective anchorage of the PSAs on the intermediate carrier, the intermediate carriers may be pretreated by the known measures such as corona, plasma or flaming. Also possible is the use of a primer. Ideally, however, there is no need for pretreatment. The reverse of the intermediate carrier may have been subjected to non-stick physical treatment or coating.

The strain of the intermediate carrier at 50% elongation, in accordance with Test Method 5, is preferably to be less than 20 N/cm, more preferably less than 10 N/cm, in order to enable simple detachment without excessive expenditure of force. Moreover, the intermediate carrier typically has an elongation at break, according to Test Method 5, of at least 100%, preferably at least 300%, and optionally a resilience, according to Test Method 6, of more than 50%.

Lastly, the PSA strip may be lined on one or both sides with a liner, this being a temporary carrier with non-stick coating on both sides. A liner (release paper, release film) is not part of a PSA strip, but merely an aid to its production, storage or for further processing by punching. Furthermore, in contrast to the intermediate carrier, a liner is not connected firmly to a layer of adhesive.

Typical converted forms of the PSA strips of the invention are adhesive tape rolls and also adhesive strips of the kind obtained, for example, in the form of die-cuts. Preferably all the layers have substantially the form of a cuboid. With further preference all of the layers are joined to one another over the full area. Optionally there may be a nonadhesive finger tab region provided, from which the detachment operation can be performed. The general expression "adhesive tape" for the purposes of this invention encompasses all sheetlike structures such as two-dimensionally extended films or film sections, tapes with extended length and limited width, tape sections, die-cuts, labels and the like. In the present invention the terms "PSA strip" and "adhesive tape" are also used synonymously.

In one preferred embodiment the peel adhesion of the PSA strip on at least one side, preferably on both sides, is less than 29 N/cm, more particularly less than 20 N/cm.

In another preferred embodiment the PSA strip is transparent. "Transparency" in the meaning of the present specification denotes a mean transmission of the specimen under investigation, such as a PSA strip or a PSA layer, in the visible region of light of at least 75%, preferably higher than 90%, with this figure relating to uncorrected transmission, in other words without subtraction of interfacial reflection losses (see Test Method 15).

The PSAs may be produced and processed either from solution or from the melt (hotmelt). The PSAs may be applied to an intermediate carrier layer, a further PSA layer or a liner by means of direct coating or by means of lamination, more particularly hot lamination.

In the solvent process, typically all of the components are dissolved in a suitable solvent (mixture), with a possible solids content as per Test Method 7 of 25-55 wt %, for example. As and where appropriate, microballoons are subjected to preliminary slurrying and then added. The solution or dispersion may be subsequently coated out, on a laboratory bench coater, for example, using a knife or a doctor blade, for example. This is followed by drying, preferably in an oven, at 100° C. for 15 min, for example, and optionally by crosslinking.

Subsequently at least two swatch specimens can be laminated one atop another in order to achieve a greater layer thickness. If the PSA layer comprises expandable microballoons, they are at least partially expanded at a suitable temperature to produce a foam. Customary large-scale industrial processes would perform these steps in an analogous way, using drying tunnels.

In the hotmelt process, all of the components are mixed to form a homogeneous composition using, for example, hot-melt compounders, twin-screw extruders or planetary roller extruders. Twin-screw extruders and planetary roller extruders can also be used in combination.

The PSA may be prepared, for example, in a continuous mixing assembly such as a planetary roller extruder (PRE), for example. This is done by feeding the starting materials intended to form the adhesive into the planetary roller extruder. At the same time, any expandable microballoons are incorporated homogeneously into the PSA during the compounding operation. The temperatures needed for the homogeneous preparation of the PSA and for the expansion of the microballoons are harmonized with one another in such a way that in the course of mixing the microballoons at least begin to expand and preferably foam in the PSA on emergence from the PRE as a result of the pressure drop at the nozzle exit, breaking through the surface of the composition as they do so. An example of a suitable apparatus is the planetary roller extruder from Entex in Bochum.

In an alternative process, the PSA is likewise produced in a planetary roller extruder (PRE). This is done by feeding the starting materials intended to form the adhesive into the planetary roller extruder. The expandable microballoons are subsequently incorporated homogeneously into the self-adhesive composition in a second mixing assembly such as a twin-screw extruder, for example, and are heated above the expansion temperature and foamed. For this purpose, the adhesive formed from the starting materials is fed here into a twin-screw extruder, and the microballoons are introduced at the same time. The twin-screw extruder has a total of four heating zones, for example, over its running length. An example of a suitable apparatus is a twin-screw extruder from Kiener.

The homogeneous composition obtained in each case can be pressed out to the desired layer thickness using a press. Coating may alternatively take place via calendar rolls, for the purpose of shaping between two liners, for example, as nozzle coating onto a liner, for example (nozzle on chill roll and stretching).

The examples described below illustrate in more detail particularly advantageous implementations of the invention, without wishing thereby to restrict the invention unnecessarily.

EXAMPLES

Commercially available chemicals used (see table 1 below)

TABLE 1

| Chemical compound | Trade name | Manufacturer | CAS No. |
|---|---|---|---|
| Radial styrene-butadiene block copolymer; with 16 wt % diblock; block polystyrene content: 23 wt % | Kraton D1116 | Kraton Polymers | 9003-55-8 |
| Linear styrene-butadiene-styrene triblock copolymer; with 78 wt % diblock; block polystyrene content: 33 wt % | Kraton D1118 | Kraton Polymers | 9003-55-8 |
| Linear styrene-butadiene-styrene triblock copolymer; with 15 wt % diblock; block polystyrene content: 29 wt % | Kraton D1152 | Kraton Polymers | 9003-55-8 |
| Solid α-pinene tackifier resin with a ring and ball softening temperature of 112 to 118° C. and a DACP of 27° C. | Piccolyte A115 | Pinova | 31393-98-3 |
| Liquid hydrocarbon resin | Wingtack 10 | Cray Valley | 26813-14-9 |
| Pentaerythritol tetrakis[3-(3,5-di-tert-butyl-4-hydroxyphenyl)propionate] | Irganox 1010 | BASF SE | 6683-19-8 |
| Tris(2,4-di-tert-butylphenyl) phosphite | Irgafos 168 FF | BASF SE | 31570-04-4 |
| Microballoons (unexpanded microspheres) | Expancel 920 DU 20 | Expancel Nobel Industries | |
| Spherical amorphous silicon dioxide (96-99% $SiO_2$); BET surface area 20 $m^2/g$; median diameter $d(0.5)$ = 150 nm | Sidistar T120U | Elkem | 69012-64-2 |
| SiLibeads glass beads, polished circular solid glass beads of soda-lime glass; median diameter $d(0.5)$ = 7 μm; bulk density 0.7 $kg/dm^3$; sphericity >= 0.89 (ratio of width to length) | SiLiBeads 0-20 μm (Article number 5209) | Sigmund Lindner (Article GmbH, Germany | 65997-17-3 |
| SiLibeads glass beads, polished circular solid glass beads of soda-lime glass; bulk density 0.7 $kg/dm^3$; sphericity >= 0.89 (ratio of width to length) | SiLiBeads 40-70 μm (Article number 5211) | Sigmund Lindner GmbH, Germany | 65997-17-3 |
| SiLibeads glass beads, polished circular solid glass beads of soda-lime glass; bulk density 0.7 $kg/dm^3$; sphericity >= 0.89 (ratio of width to length) | SiLiBeads 90-150 μm (Article number 5213) | Sigmund Lindner GmbH, Germany | 65997-17-3 |
| Spherical $TiO_2$ particles, $TiO_2$ content >= 90.5%, median diameter $d(0.5)$ = 600 nm | Kronos 2360 | Kronos | 13463-67-7 |
| Hydrophilic fumed silica, specific surface area = 170 to 210 $m^2/g$, $SiO_2$ content (based on calcined substance) >= 99.8%, diameter (primary particles) by SEM (cryofracture edge) about 12 nm, diameter (secondary particles, i.e., aggregates, not separable into primary particles) by SEM (cryofracture edge) in the order of magnitude of 100 nm | Aerosil® 200 | Aerosil® | 112945-52-5 7631-86-9 |
| Fumed silica aftertreated with hexadecyl silane, specific surface area = 200 $m^2/g$, $SiO_2$ content (based on calcined substance) >99.8%, diameter (primary particles) by SEM (cryofracture edge) about 12 nm, diameter (secondary particles, i.e., aggregates, not separable into primary particles) by SEM (cryofracture edge) in the order of magnitude of 100 nm | Aerosil® R816 | Aerosil® | 199876-45-4 |
| Phyllosilicate, i.e., in layer form rather than spherical | Garamite 1958 | Byk Additives and Instruments | 68953-58-2 |

Test Methods

Unless otherwise indicated, all measurements were conducted at 23° C. and 50% relative humidity. The mechanical and technical adhesive data were ascertained as follows:

Test Method 1: Glass Transition Temperature ($T_g$)

Glass transition points—referred to synonymously as glass transition temperatures—are reported as the result of measurements by dynamic scanning calorimetry (DSC) according to DIN 53 765; especially sections 7.1 and 8.1, but with uniform heating and cooling rates of 10 K/min in all heating and cooling steps (see DIN 53 765; section 7.1; note 1). The initial sample mass is 20 mg.

Test Method 2: Median Particle Diameter d(0.5)

The median diameter d(0.5) of primary particles is determined by laser diffraction on a suspension of the particles in deionized water, on the basis of the distribution curve of proportional volume plotted over the particle size. If the primary particles in the suspension are not separate from the outset, they can be separated prior to the measurement by the action of shear on the suspension. Here, d(0.5) is defined as the particle size value for which the summated volume fractions reach 0.5, i.e., 50%. The median diameter d(0.5) is therefore a volume-averaged diameter. The median diameter is determined by laser diffraction with a darkening of 17±1%. Using the specified technique, the median diameter may be determined using commercially customary instruments intended for this purpose, for example using the "Mastersizer" line from Malvern (e.g., Mastersizer 2000, Mastersizer 3000).

Test Method 3: Thickness

The thickness of a layer or of a PSA strip may be ascertained using commercially customary thickness gauges (sensor test instruments) with accuracies of less than 1 μm deviation. If fluctuations of thickness are found, the average value of measurements at not less than three representative sites is reported—that is, in particular, not including measurement at wrinkles, creases, nibs and the like.

Test Method 4: Density

The density of layers is ascertained by forming the ratio of weight per unit area and thickness of the layer. The thickness of the layer is determined according to Test Method 3.

Test Method 5: Elongation at Break, Tensile Strength and Strain at 50% Elongation The elongation at break, the tensile strength and the strain at 50% elongation are measured in a method based on DIN 53504 using S3-size dumbbell specimens at a separation velocity of 300 mm per minute. The test conditions are 23° C. and 50% relative humidity.

Test Method 6: Resilience or Elasticity

Resilience is measured by elongating the test specimen by 100%, holding it in this elongation for 30 s, and then releasing it. After a waiting time of 1 min, the length is measured again.

The resilience is then calculated as follows: $RS=((L_{100}-L_{end})/L_0) \cdot 100$, where $RS$=resilience in %
$L_{100}$: length of adhesive strip after elongation by 100%
$L_0$: length of adhesive strip before elongation
$L_{end}$: length of adhesive strip after relaxation for 1 min.

The resilience here corresponds to the elasticity.

Test Method 7: Solids Content

The solids content is a measure of the fraction of non-vaporizable constituents in a PSA. It is determined gravimetrically, with the PSA being weighed, then the vaporizable fractions being evaporated off in a drying cabinet at 120° C. for two hours, and the residue being weighed again.

Test Method 8: Coat Weight

The coat weight of a PSA layer in g/m² can be determined by determining the mass of a section of such an adhesive layer applied to a carrier or liner, the section being of defined length and defined width, minus the (known or separately ascertainable) mass of a section of the carrier or liner used that has the same dimensions. Any solvents present are disregarded in this measurement.

Test Method 9: Tear Susceptibility 100 strips 10 mm in width and 40 mm long are punched from the PSA strip under investigation. These strips are bonded over a length of 30 mm to a PC plate cleaned with ethanol, to form a finger tab 10 mm long. A second PC plate is bonded to the second side of the bonded strips, specifically in such a way that the two PC plates lie flush over one another. The assembly is rolled over ten times using a 4 kg roller (five times back and forward). After a peel adhesion time of 24 h, the 100 strips are stripped from the bond line manually, using the finger tab, at a peel angle of
 a) about 45° with respect to the bond plane, or alternatively
 b) about 90° with respect to the bond plane, or alternatively
 c) about 0° with respect to the bond plane, i.e., substantially in the bond plane.

An assessment is made of how many of the 100 specimens tear on stripping at the selected angle, the result being reported in %.

Test Method 10: Tack (Probe Tack)

With the probe tack method, the bonding behavior of a double-sided adhesive tape, i.e., PSA strip, is characterized using a "Texture Analyser TA.XT2i" from Stable Micro Systems.

In the method, a probe with a cylindrical steel die is moved vertically onto the adhesive at a specified test velocity up to a defined pressing force, and, after a defined contact time, is removed again, the velocity likewise being specified. During this operation, the force applied for the pressing and the detachment, respectively, is recorded as a function of the travel distance.

Instrument:
Texture Analyser TA.XT2i from SMS (Stable Micro Systems Ltd.) or
Texture Analyser TA.XT plus from SMS (Stable Micro Systems Ltd.) measuring head/force probe: 5 kg with measuring range: 0.001 to 50 N Tack die:
Standard: cylinder (stainless steel): Ø 2 mm
Test conditions:
Standard: 23±1° C./50±5% relative humidity The sample for measurement is bonded to a steel plate without bubbles and in a defined manner, by rolling a 2 kg roller back and forward over it at 150 mm/s. The steel die is cleaned in acetone and conditioned at RT for 30 min. The release paper is not removed from the adhesive strip until immediately before the measurement.

The steel plate is screwed firmly in the sample bench and adjusted beneath the die.

The test parameters for selection are as follows:
Tack die: cylinder (stainless steel): Ø 2 mm
Pre-test speed: 0.1 mm/s
Test speed: 0.1 mm/s
Trigger force: 0.05 N
Post-test speed: 1.5 mm/s
Contact time: 0.01 sec
Pressing force: 1 N Before each individual measurement, it is necessary to position the sample bench beneath the probe and secure it by screwing. The distance between the measurement locations is three times the diameter of the die.

10 individual measurements are carried out on each sample in order to calculate the average. The die is generally not cleaned between individual measurements, unless there are deposits on the die, or the measurement series shows a significant trend. The measurements performed are averaged.

From the measurement curve (graph of the force [N] as a function of the travel distance [mm]), a determination is made of the maximum force: this figure is referred to as the probe tack.

Test Method 11: 180° Peel Adhesion Test

The peel strength (peel adhesion) is tested in a method based on PSTC-1. A strip 1 cm wide of an adhesive tape consisting of (i) a PET film 23 μm thick and (ii) a PSA strip applied thereon in the form of a double-sided adhesive tape as described in the present specification is adhered on the test substrate in the form of an ASTM steel plate, the surface of the latter having been cleaned with acetone beforehand, by rolling over back and forth five times using a 4 kg roller. The plate is clamped in and the adhesive tape is peeled from the plate via its free end on a tensile test machine, with a velocity of 300 mm/min and at a peel angle of 180°, and the force needed to achieve this is ascertained. The results of the measurement are reported in N/cm (i.e., standardized to the width of the adhesive tape) and are averaged from three measurements.

Test Method 12: Transverse Impact Strength (DuPont Test in the x,y Plane)

A square sample in the shape of a frame was cut from the PSA strip under investigation (external dimensions 33 mm×33 mm; border width 2.0 mm; internal dimensions (window cutout) 29 mm×29 mm). This sample is adhered to a PC frame (external dimensions 45 mm×45 mm; border width 10 mm; internal dimensions (window cutout) 25 mm×25 mm; thickness 3 mm). On the other side of the PSA strip a PC window of 35 mm×35 mm is adhered. PC frame, adhesive tape frame and PC window are bonded such that the geometric centers and the diagonals each lay over one another (corner to corner). The bond area is 248 mm². The bond is pressed at 248 N for 5 s and stored under conditions of 23° C./50% relative humidity for 24 hours.

Directly after storage, the bonded assembly consisting of PC frame, PSA strip and PC pane is clamped by the protruding edges of the PC frame into a sample holder in such a way that the assembly is aligned vertically. The sample holder is then inserted centrally into the designated holder of the DuPont Impact Tester. The impact head, weighing 150 g, is inserted in such a way that the rectangular impact geometry with dimensions of 20 mm×3 mm impacts centrally and flush on the upwardly directed end face of the PC window.

A weight having a mass of 150° g guided on two guide rods is dropped vertically from a height of 5 cm onto the assembly arranged in this way and composed of sample holder, sample and impact head (measuring conditions 23° C., 50% relative humidity).

The height of the dropped weight is increased in 5 cm steps until the impact energy introduced destroys the sample as a result of the transverse impact load, and the PC window parts from the PC frame.

In order to be able to compare experiments with different samples, the energy is calculated as follows:

$$E \text{ [J]=height [m]*mass of weight [kg]*9.81 kg/m*s}^2$$

Five samples per product are tested and the mean energy value is reported as the index of the transverse impact strength.

Test Method 13: Penetrative Impact Strength (DuPont Test in the z Plane)

A square sample in the shape of a frame was cut from the PSA strip under investigation (external dimensions 33 mm×33 mm; border width 2.0 mm; internal dimensions (window cutout) 29 mm×29 mm). This sample is adhered to a polycarbonate (PC) frame (external dimensions 45 mm×45 mm; border width 10 mm; internal dimensions (window cutout) 25° mm×25 mm; thickness 3 mm). On the other side of the PSA strip a PC window of 35 mm×35 mm is adhered. PC frame, adhesive tape frame and PC window are bonded such that the geometric centers and the diagonals each lay over one another (corner to corner). The bond area is 248 mm². The bond is pressed at 248 N for 5 s and stored under conditions of 23° C./50% relative humidity for 24 hours.

Directly after storage, the bonded assembly consisting of PC frame, PSA strip and PC pane is clamped by the protruding edges of the PC frame into a sample holder in such a way that the assembly is aligned horizontally. The PC frame here lies flat at the protruding edges on the sample holder, so that the PC window is in free suspension (held by the adhesive tape specimen) below the PC frame. The sample holder is then inserted centrally into the designated holder of the DuPont Impact Tester. The impact head, weighing 150 g, is inserted in such a way that the circular impact geometry with a diameter of 24 mm impacts centrally and flush on the face of the PC window that is freely accessible from above.

A weight having a mass of 150 g guided on two guide rods is dropped vertically from a height of 5 cm onto the assembly arranged in this way and composed of sample holder, sample and impact head (measuring conditions 23° C., 50% relative humidity).

The height of the dropped weight is increased in 5 cm steps until the impact energy introduced destroys the sample as a result of the penetrative impact load, and the PC window parts from the PC frame.

In order to be able to compare experiments with different samples, the energy is calculated as follows:

$$E \text{ [J]=height [m]*mass of weight [kg]*9.81 kg/m*s}^2$$

Five samples per product are tested and the mean energy value is reported as the index of the penetrative impact strength.

Test Method 14: Surface Roughness $R_a$

The surface roughness $R_a$ is determined by laser triangulations. The PRIMOS system used consists of an illumination unit and a recording unit. The illumination unit projects lines onto the surface with the aid of a digital micro-mirror projector. These projected parallel lines are deflected or modulated by the surface structure. For the registration of the modulated lines, a CCD camera arranged at a particular angle, called the triangulation angle, is used.

Measurement field size: 14.5×23.4 mm²
Profile length: 20.0 mm
3D area roughness: 1.0 mm away from the edge (Xm=21.4 mm; Ym=12.5 mm)
Filtering: $3^{rd}$ order polynomial filter The surface roughness $R_a$ represents the average height of the roughness, more particularly the average absolute distance from the center line (regression line) of the roughness profile within the evaluation range. In other words, $R_a$ is the arithmetic mean roughness, i.e., the arithmetic mean value of all profile values in the roughness profile.

Corresponding measuring instruments can be acquired from sources including GFMesstechnik GmbH in Teltow.

Test Method 15: Transmission

For sample preparation, the specimen under investigation, such as more particularly the PSA strip or PSA layer, is applied without bubbles to a polycarbonate film (125 µm Lexan 8010 with freshly exposed surfaces). The transmission of the specimen is determined by way of the VIS spectrum. The VIS spectrum is recorded on a UVIKON 923 from Kontron. The wavelength range of the measured spectrum embraces all wavelengths between 800 nm and 400 nm with a resolution of 1 nm. A blank channel measurement is carried out as a reference over the entire wavelength range. For the reporting of the result, the transmission measurements are averaged within the stated range. There is no correction for interfacial reflection losses.

Production of the PSA strips (a) Examples 1 to 7: Single-Layer PSA Strips Based on Vinyl Aromatic Block Copolymer (Formulation 1), Produced by the Hotmelt Process In the noninventive example 5, 380 g of Kraton D1152, 120 g of Kraton D1118, 460 g of Piccolyte A 115, 30 g of Wingtack 10, 5.0 g of Irgafos 168 FF, 5.0 g of Irganox 1010 (formulation 1) were mixed using a hotmelt compounder at 170° C. for two hours to form a homogeneous composition, which was pressed out using a press between two PET liners 75 µm thick to a layer thickness of 150 µm, thus producing a single-layer transparent PSA strip without filler.

Inventive examples 1 to 4 differ from example 5 only in that different amounts of Sidistar T120U were added additionally to the components stated in example 5. Accordingly 2.5 wt % (example 1), 5 wt % (example 2), 7.5 wt % (example 3) and 10 wt % (example 4) of Sidistar T120U were added, with the weight fractions of Sidistar T120U here being based in each case on the total weight of the other components (i.e., the weight of the other components is set at 100%). The result in each case is a single-layer transparent PSA strip comprising filler according to the invention.

Noninventive examples 6 and 7 differ from example 5 only in that 5 wt % of Garamite 1958 (example 6) or 7.5 wt % of Aerosil® 200 were added additionally to the components stated in example 5, with the weight fractions of Garamite 1958 or Aerosil® 200 being based here in each case on the total weight of the other components (i.e., the weight of the other components is set at 100%). The result in each case is a single-layer transparent PSA strip comprising noninventive filler.

(b) Examples 8-10 and 24 to 27: Single-Layer PSA Strips Based on Vinyl Aromatic Block Copolymer (Formulation 3), Produced by the Hotmelt Process In the inventive example 9, 380 g of Kraton D1152, 120 g of Kraton D1118, 460.0 g of Piccolyte A 115, 30 g of Wingtack 10, 30.0 g of Kronos 2360, 5 g of Irgafos 1010, 5.0 g of Irgafos 168 FF (formulation 3) were mixed using a hotmelt compounder at 170° C. for two hours to form a homogeneous composition, which was pressed out using a press between two PET liners 75 μm thick to a layer thickness of 150 μm, thus producing a white single-layer PSA strip, which comprises filler according to the invention.

For comparison, examples 8 and 10 were conducted. Inventive example 8 differs from example 9 only in that rather than 30.0 g of Kronos 2360, the same amount (30 g) of Sidistar T120U was added. The end product was therefore a transparent single-layer PSA strip likewise comprising filler according to the invention. Noninventive example 10 differs from example 9 only in that 30.0 g of Kronos 2360 were omitted, i.e., no filler was used. The end product was therefore a transparent single-layer PSA strip containing no filler.

Inventive example 24 differs from example 9 only in that additionally 5 wt % of Sidistar T120U were added, with the weight fraction of Sidistar T120U being based on the total weight of the other components (i.e., the weight of the other components is set at 100%). The end product is therefore a white single-layer PSA strip likewise comprising filler according to the invention. Examples 25 (inventive) and 26 to 27 (noninventive) differ from example 9 only in that additionally 5 wt % of SiLibeads, 0-20 μm (example 25), 5 wt % of SiLibeads, 40-70 μm (example 26) or 5 wt % of SiLibeads, 90-150 μm (example 27) were added, with the weight fraction of the SiLibeads being based in each case on the total weight of the other components (i.e., the weight of the other components is set at 100%). The result in each case is a white single-layer PSA strip comprising filler.

(c) Examples 11 to 17: Single-Layer PSA Strips Based on Vinyl Aromatic Block Copolymer (Formulation 2), Produced by the Solvent Process In noninventive example 14 first a 40 to 55 wt % strength adhesive solution in a solvent mixture of benzine/toluene/acetone (in which the solvents were used in the stated sequence in a weight ratio of 69:20:11) was produced from 380 g of Kraton D1152, 120 g of Kraton D1118, 460 g of Piccolyte A 115, 30 g of Wingtack 10, 5.0 g of Irgafos 168 FF and 5.0 g of Irganox 1010 (formulation 2). The adhesive solution obtained was then coated out in the desired layer thickness, using a coating bar, onto a PET liner furnished with a silicone release, after which the solvent was removed by evaporation at 100° C. for 15 min to dry the layer of composition. This produced a transparent PSA layer containing no filler. The coat weight was selected such that the PSA layer had a thickness of 75 μm. Then two such PSA layers were laminated one atop the other to produce a transparent single-layer PSA strip having a thickness of 150 μm and containing no filler.

Inventive examples 11 to 13 differ from example 14 only in that different amounts of Sidistar T120U were added additionally to the components stated in example 14. Accordingly 2.5 wt % (example 11), 5 wt % (example 12) or 7.5 wt % (example 13) of Sidistar T120U were added, with the weight fractions of Sidistar T120U here being based in each case on the total weight of the other components (without taking account of the solvent mixture, i.e., the dry weight of the other components is set at 100%). The result in each case is a transparent single-layer PSA strip having a thickness of 150 μm and comprising filler according to the invention.

Noninventive examples 15 to 17 differ from example 14 only in that different amounts of Aerosil® R816 were added additionally to the components stated in example 14. Accordingly 2.5 wt % (example 15), 5 wt % (example 16) or 7.5 wt % (example 17) of Aerosil® R816 were added, with the weight fractions of Aerosil® R816 here being based in each case on the total weight of the other components (without taking account of the solvent mixture, i.e., the dry weight of the other components is set at 100%). The result in each case is a transparent single-layer PSA strip having a thickness of 150 μm and comprising noninventive filler.

(d) Examples 18 to 23: Three-Layer PSA Strips Based on Vinyl Aromatic Block Copolymer In noninventive example 20, 500.0 g of Kraton D1152, 485.0 g of Piccolyte A 115, 5.0 g of Irganox 1010 and 5.0 g of Irgafos 168 FF (formulation 4) were mixed to form a homogeneous composition using a hotmelt compounder at 170° C. for two hours and the mixture was pressed out using a press to a layer thickness of 100 μm between two PET liners 75 μm thick, to produce a transparent PSA layer containing no filler.

Furthermore, a 36 wt % strength adhesive solution in a solvent mixture of benzine/toluene/acetone (in which the solvents were used in the stated sequence in a weight ratio of 65:25:10) was produced from 200 g of Kraton D1116, 300 g of Kraton D1118, 490 g of Piccolyte A 115, 5 g of Irgafos 168 FF and 5 g of Irganox 1010 (formulation 6). The adhesive solution obtained was subsequently admixed with 15 g of unexpanded Expancel 920 DU20 microballoons, the microballoons being used in the form of a slurry in acetone. The mixture obtained was then coated out using a coating bar at a coat weight of 17 g/m² (solvents disregarded), onto a PET liner furnished with a silicone release, after which the solvent was removed by evaporation at 100° C. for 15 min to dry the layer of composition. The product was a PSA layer which comprises unexpanded microballoons.

The above-described transparent PSA layer containing no filler was laminated onto the free surface of the PSA layer thus produced, containing unexpanded microballoons. Atop the second surface of the transparent PSA layer, the free surface of a second PSA layer containing unexpanded microballoons, produced as described above, was laminated, resulting in an unfoamed symmetrical three-layer assembly composed of the inner transparent PSA layer containing no filler, and of two PSA layers provided with liners and containing unexpanded microballoons.

After drying, the three-layer construction was foamed in an oven at 170° C. for 30 s between the two liners, resulting in outer PSA layers having thicknesses each of about 25 μm. As a result of the foaming between two liners, products having particularly smooth surfaces are obtainable (surface roughness $R_a$ less than 15 μm).

Inventive examples 18 and 19 differ from example 20 only in that, in the production of the transparent PSA layer, different amounts of Sidistar T120U were added additionally to the stated components. Hence 2.5 wt % (example 18) or 5 wt % (example 19) of Sidistar T120U were added, with the weight fractions of Sidistar T120U here being based in each case on the total weight of the other components (i.e., the weight of the other components is set at 100%). The product in each case is a three-layer PSA strip whose inner PSA layer comprises filler according to the invention and whose outer PSA layers are foamed.

In noninventive example 23, 380 g of Kraton D1152, 120 g of Kraton D1118, 460 g of Piccolyte A 115, 30 g of Wingtack 10, 5.0 g of Irgafos 168 FF and 5.0 g of Irganox 1010 (formulation 1) were mixed to form a homogeneous composition using a hotmelt compounder at 170° C. for two hours and the mixture was pressed out using a press to a layer thickness of 100 μm between two PET liners 75 μm thick, to produce a transparent PSA layer containing no filler.

Furthermore, a 36 wt % strength adhesive solution in a solvent mixture of benzine/toluene/acetone (in which the solvents were used in the stated sequence in a weight ratio of 65:25:10) was produced from 200 g of Kraton D1116, 300 g of Kraton D1118, 490 g of Piccolyte A 115, 5 g of Irgafos 168 FF and 5 g of Irganox 1010 (formulation 6). The adhesive solution obtained was subsequently admixed with 15 g of unexpanded Expancel 920 DU20 microballoons, the microballoons being used in the form of a slurry in acetone. The mixture obtained was then coated out using a coating bar at a coat weight of 17 g/m² (solvents disregarded), onto a PET liner furnished with a silicone release, after which the solvent was removed by evaporation at 100° C. for 15 min to dry the layer of composition. The product was a PSA layer which comprises unexpanded microballoons.

The above-described transparent PSA layer containing no filler was laminated onto the free surface of the PSA layer thus produced, containing unexpanded microballoons. Atop the second surface of the transparent PSA layer, the free surface of a second PSA layer containing unexpanded microballoons, produced as described above, was laminated, resulting in an unfoamed symmetrical three-layer assembly composed of the inner transparent PSA layer containing no filler, and of two PSA layers provided with liners and containing unexpanded microballoons.

After drying, the three-layer construction was foamed in an oven at 170° C. for 30 s between the two liners, resulting in outer PSA layers having thicknesses each of about 25 μm. As a result of the foaming between two liners, products having particularly smooth surfaces are obtainable (surface roughness $R_a$ less than 15 μm).

Inventive examples 21 and 22 differ from example 23 only in that, in the production of the transparent PSA layer, different amounts of Sidistar T120U were added additionally to the stated components. Hence 2.5 wt % (example 21) or 5 wt % (example 22) of Sidistar T120U were added, with the weight fractions of Sidistar T120U here being based in each case on the total weight of the other components (i.e., the weight of the other components is set at 100%). The product in each case is a three-layer PSA strip whose inner PSA layer comprises filler according to the invention and whose outer PSA layers are foamed.

Experimental Results

The PSA strips referred to as inventive can be redetached, without residue or destruction, by extensive stretching substantially in the bond plane, i.e., at a peel angle of about 0°.

Table 2 shows mechanical and technical adhesive properties of the single-layer PSA strips based on vinyl aromatic block copolymer (formulation 1), produced by the hotmelt process.

TABLE 2

| Example | Tearing susceptibility (45°) [%] | Tearing susceptibility (90°) [%] | Tack [N] | Peel adhesion [N/cm] | DuPont x, y [J] | DuPont z [J] |
|---|---|---|---|---|---|---|
| 1 | 25 | 79 | 3.7 | 17.3 | 0.9 | 0.5 |
| 2 | 13 | 54 | 3.4 | 16.6 | 0.9 | 0.5 |
| 3 | 8 | 29 | 3.9 | 16.7 | 0.9 | 0.6 |
| 4 | 0 | 13 | 4.2 | 17.0 | 0.9 | 0.6 |
| 5 | 79 | 98 | 3.7 | 16.4 | 1.0 | 0.6 |
| 6 | 33 | 25 | 1.1 | 11.4 | 0.7 | 0.2 |
| 7 | 96 | 100 | 2.6 | 14.2 | | |

A comparison of examples 1 to 4 with example 5 shows that the inventive spherical filler particles of Sidistar T120U significantly reduce the tearing susceptibility of the PSA strip, at peel angles both of 45° and of 90°. Moreover, there is no substantial adverse effect on the technical adhesive properties such as the tack and the peel adhesion. The same is true of the shock resistance. Examples 1 to 4 also show that the tearing susceptibility can be adjusted via the filler content as well.

Example 6 also shows that the Garamite 1959 phyllosilicate which accordingly is not spherical does lower the tearing susceptibility, but leads to unacceptable technical adhesive properties (tack, peel adhesion) for the PSA strip.

Example 7 shows that Aerosil® 200, and hence a filler not separable into its primary particles, has the effect in particular that the PSA strip becomes brittle. The tearing susceptibility is in fact higher than without filler. Moreover, a significant deterioration in tack and peel adhesion is apparent. Because of these inadequate values, the specimens were not investigated further (shock resistance).

(b) Tables 3a and 3b show mechanical and technical adhesive properties of the single-layer PSA strips based on vinyl aromatic block copolymer (formulation 3), produced by the hotmelt process.

TABLE 3a

| Example | Tearing susceptibility (45°) [%] | Tearing susceptibility (90°) [%] |
|---|---|---|
| 8 | 17 | 67 |
| 9 | 49 | 100 |
| 10 | 78 | 100 |

A comparison of example 9 with example 10 shows that with different spherical filler particles as well, such as the Kronos 2360 titanium dioxide, for example, the tearing susceptibility can be reduced. A comparison of example 9 with example 8 also shows that replacing the Kronos 2360 titanium dioxide with the same amount of Sidistar T120U again produces a substantial reduction in the tearing susceptibility.

TABLE 3b

| Example | Tearing susceptibility (45°) [%] | Tearing susceptibility (90°) [%] | Tack [N] | Peel adhesion [N/cm] | DuPont x, y [J] | DuPont z [J] |
|---|---|---|---|---|---|---|
| 24 | 8 | 17 | 4.0 | 12.2 | 0.9 | 0.5 |
| 25 | 9 | 25 | 3.9 | 11.8 | 0.9 | 0.5 |

TABLE 3b-continued

| Example | Tearing susceptibility (45°) [%] | Tearing susceptibility (90°) [%] | Tack [N] | Peel adhesion [N/cm] | DuPont x, y [J] | DuPont z [J] |
|---|---|---|---|---|---|---|
| 26 | 22 | 67 | 3.9 | 11.0 | 0.9 | 0.4 |
| 27 | 44 | 89 | 3.6 | 11.0 | 0.8 | 0.3 |
| 9 | 52 | 100 | 4.0 | 13.6 | 0.9 | 0.5 |

The influence of filler particle size on tearing susceptibility is made clear by examples 24 to 27. It is apparent therefrom that for a given filler fraction, smaller particles are evidently able to lower the tearing susceptibility to a much greater extent than comparatively large particles. Smaller particles also influence the adhesive properties such as peel adhesion and tack, and also the shock resistance, to less of an extent than comparatively large particles.

(c) Tables 4a and 4b show mechanical and technical adhesive properties of the single-layer PSA strips based on vinyl aromatic block copolymer (formulation 2), produced by the solvent process.

TABLE 4a

| Example | Tearing susceptibility (45°) [%] | Tearing susceptibility (90°) [%] | Tack [N] | Peel adhesion [N/cm] | DuPont x, y [J] | DuPont z [J] |
|---|---|---|---|---|---|---|
| 11 | 4 | 13 | 4.1 | 15.0 | 1.0 | 0.5 |
| 12 | 0 | 8 | 3.6 | 15.5 | 0.9 | 0.5 |
| 13 | 0 | 0 | 3.3 | 14.9 | 0.8 | 0.5 |
| 14 | 45 | 85 | 3.9 | 14.8 | 1.0 | 0.5 |

Examples 11 to 14 show that by the solvent process as well it is possible to produce PSA strips comprising spherical filler particles (Sidistar T120U) which by comparison with the filler-free PSA strip exhibit substantially reduced tearing susceptibility (at peel angles both of 45° and of 90°). Moreover, there is no substantial deterioration in the technical adhesive properties such as the tack and the peel adhesion as a result of the particles. The same is true of the shock resistance.

TABLE 4b

| Example | Tearing susceptibility (45°) [%] | Tearing susceptibility (90°) [%] | Tack [N] | Peel adhesion [N/cm] |
|---|---|---|---|---|
| 14 | 45 | 85 | 3.9 | 14.8 |
| 15 | 50 | 88 | 3.7 | 13.8 |
| 16 | 46 | 88 | 3.1 | 12.5 |
| 17 | 51 | 81 | 2.9 | 10.4 |

Examples 14 to 17 show that there is no improvement in tearing susceptibility from using the hydrophobic Aerosil® R816 in different amounts, relative to the filler-free PSA strip. Moreover, a deterioration in tack and peel adhesion is apparent. On the basis of these inadequate values, no further investigation of the specimens (shock resistance) took place.

(d) Tables 5a and 5b show mechanical and technical adhesive properties of the three-layer PSA strips based on vinyl aromatic block copolymer.

TABLE 5a

| Example | Tearing susceptibility (45°) [%] | Tearing susceptibility (90°) [%] | Tack [N] | Peel adhesion [N/cm] | DuPont x, y [J] | DuPont z [J] |
|---|---|---|---|---|---|---|
| 18 | 13 | 18 | 3.7 | 11.8 | 0.9 | 0.7 |
| 19 | 10 | 14 | 3.8 | 11.8 | 1.0 | 0.7 |
| 20 | 31 | 47 | 3.7 | 12.2 | 1.0 | 0.7 |

TABLE 5b

| Example | Tearing susceptibility (45°) [%] | Tearing susceptibility (90°) [%] | Tack [N] | Peel adhesion [N/cm] | DuPont x, y [J] | DuPont z [J] |
|---|---|---|---|---|---|---|
| 21 | 25 | 74 | 3.9 | 12.1 | 1.1 | 0.8 |
| 22 | 21 | 30 | 3.6 | 12.0 | 1.1 | 0.8 |
| 23 | 50 | 88 | 3.7 | 11.8 | 0.9 | 0.7 |

Examples 18 to 23 show that in multilayer PSA strips as well, such as a three-layer construction, the tearing susceptibility can be significantly reduced by the incorporation of a filler according to the invention (in the present case: Sidistar T120U) into at least one layer, with the filler not leading to reduced tack, reduced peel adhesion or reduced shock resistance. In the three-layer construction as well it is possible to adjust the tearing susceptibility through the amount of filler.

Furthermore, a comparison of examples 18 to 20, whose inner layer has a comparatively low diblock fraction in the vinyl aromatic block copolymer, with examples 21 to 23, shows that a reduction in the diblock fraction in the vinyl aromatic block copolymer can bring about a lowering of the tearing susceptibility. It is presumed that in examples 18 to 20 the tearing susceptibility is also influenced positively because the inner layer (and the outer layers) in examples 18 to 20 contains no liquid resin.

A comparison of example 23, whose outer PSA layers comprise radial vinyl aromatic block copolymer in the form of Kraton D1116, with example 5 also shows that in a PSA strip based on vinyl aromatic block copolymer, the tearing susceptibility can be reduced by at any rate proportional use of radial vinyl aromatic block copolymer.

Furthermore, examples 18 to 23 show that the shock resistance of PSA strips of the invention can be increased by means of foaming, using expanded microballoons, for example.

The invention claimed is:

1. A pressure-sensitive adhesive strip (PSA strip) which is redetachable, without residue or destruction, by extensive stretching substantially in a bond plane formed between the PSA strip and a substrate to which the PSA strip is bonded, the PSA strip comprising one or more layers of pressure-sensitive adhesive (PSA layers) and optionally one or more intermediate carrier layers,
  where at least one of the PSA layers comprises at least one filler which can be separated into its primary particles, the primary particles
    (i) being spherical, and
    (ii) having a median diameter d(0.5) of less than 10 μm,
  and where a ratio of the median diameter d(0.5) of the primary particles to a thickness of a PSA layer containing the primary particles is less than 1:2.

2. The PSA strip as claimed in claim 1,
  wherein the primary particles have a median diameter d(0.5) of 10 nm to 1 μm.

3. The PSA strip as claimed in claim 1,
wherein primary particles have a median diameter d(0.5) of 100 nm to less than 10 μm.

4. The PSA strip as claimed in claim 1, wherein the ratio of the median diameter d(0.5) of the primary particles to the thickness of a PSA layer containing the primary particles is less than 1:5.

5. The PSA strip as claimed in claim 1, wherein the particles of the filler are inorganic particles.

6. The PSA strip as claimed in claim 1, wherein the filler is present in the PSA layer at up to 50 wt % based on the total weight of the PSA layer.

7. The PSA strip as claimed in claim 1, wherein at least one PSA layer is based on vinyl aromatic block copolymer, where the vinyl aromatic block copolymer comprises (i) polymer blocks predominantly formed by polymerization of vinyl aromatics (A blocks), and at the same time (ii) polymer blocks predominantly formed by polymerization of conjugated dienes having 4 to 18 carbon atoms and/or isobutylene (B blocks), where the B blocks are optionally at least partly hydrogenated.

8. The PSA strip as claimed in claim 7,
wherein
the vinyl aromatic block copolymer of the PSA layer comprises triblock copolymer A-B-A and/or multiblock copolymer, and optionally, further, diblock copolymer A-B.

9. The PSA strip as claimed in claim 8,
wherein
the vinyl aromatic block copolymer consists to an extent of at least 90 wt % of diblock copolymer A-B and triblock copolymer A-B-A.

10. The PSA strip as claimed in claim 8,
wherein
the vinyl aromatic block copolymer comprises radial block copolymer (A-B)nX or (A-B-A)nX, in which in each case X is the radical of a coupling reagent or initiator and n is an integer ≥3, where a fraction of the radial block copolymer in relation to a total block copolymer content is more than 10 wt %.

11. The PSA strip as claimed in claim 8, wherein a fraction of diblock copolymer in relation to a total block copolymer content is 10 to 65 wt %.

12. The PSA strip as claimed in claim 1, wherein one or more layers are syntactic or nonsyntactic foams, where the layers optionally comprise hollow glass beads, hollow polymer beads, hollow ceramic beads, at least partially expanded microballoons, or a mixture thereof.

13. The PSA strip as claimed in claim 1, wherein one or more PSA layers, containing the filler which can be separated into its primary particles, comprise at least one further filler.

14. The PSA strip as claimed in claim 1, wherein the PSA strip consists of a single PSA layer.

15. The PSA strip as claimed in claim 1, wherein the PSA strip consists of at least two layers.

16. The PSA strip as claimed in claim 15,
wherein at least one layer has a thickness of less than 50 μm, and optionally at least one further layer has a thickness of more than 30 μm.

17. The PSA strip as claimed in claim 1, wherein the PSA strip has a thickness of less than 3000 μm.

18. The PSA strip as claimed in claim 1, wherein the PSA strip on at least one side exhibits a peel adhesion of less than 29 N/cm.

19. The PSA strip as claimed in claim 1, wherein the PSA strip is transparent.

20. A method for producing a PSA strip as claimed in claim 1, comprising
conducting a solvent-based coating method or hotmelt coating method and thereby producing the PSA strip.

21. A combination comprising a PSA strip as claimed in claim 1 bonded to an electronics component.

22. A method of debonding comprising:
(a) providing a combination comprising a PSA strip as claimed in claim 1 bonded to a substrate;
(b) debonding the PSA strip from said substrate by extensive stretching of the PSA strip in a plane of a bond formed between the PSA strip and the substrate so that the PSA strip detaches from the substrate without destruction or residue.

23. The method according to claim 22, wherein the substrate is an electronics component.

* * * * *